(12) United States Patent
Matsumoto et al.

(10) Patent No.: US 8,500,559 B2
(45) Date of Patent: *Aug. 6, 2013

(54) GAME APPARATUS, GAMING METHOD, AND GAME PROGRAM

(75) Inventors: Naoko Matsumoto, Ashiya (JP); Hiroyuki Masuda, Kobe (JP); Masanori Kono, Kobe (JP); Yoshito Fukuda, Kobe (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 630 days.

This patent is subject to a terminal disclaimer.

(21) Appl. No.: 12/437,450

(22) Filed: May 7, 2009

(65) Prior Publication Data

US 2009/0221356 A1    Sep. 3, 2009

Related U.S. Application Data

(63) Continuation of application No. PCT/JP2007/067913, filed on Sep. 14, 2007.

(30) Foreign Application Priority Data

Nov. 14, 2006 (JP) ................................. 2006-307656

(51) Int. Cl.
  *G07F 17/32* (2006.01)
(52) U.S. Cl.
  USPC ................... 463/42; 463/37; 463/38
(58) Field of Classification Search
  USPC .............................................. 463/37, 38, 42
  See application file for complete search history.

(56) References Cited

U.S. PATENT DOCUMENTS

| 4,359,220 A | * | 11/1982 | Morrison et al. ............... 463/9 |
| 6,225,547 B1 | | 5/2001 | Toyama et al. |
| 6,409,603 B1 | | 6/2002 | Nishino et al. |

(Continued)

FOREIGN PATENT DOCUMENTS

| JP | H06-285259 A | 10/1994 |
| JP | 2001-232063 A | 8/2001 |

(Continued)

OTHER PUBLICATIONS

Notifice of Rejection of the corresponding Korean Application No. 10-2009-7008425, dated Mar. 30, 2011.

(Continued)

*Primary Examiner* — Omkar Deodhar
(74) *Attorney, Agent, or Firm* — Global IP Counselors, LLP

(57) ABSTRACT

A game apparatus is provided that determines an operation result based on a player's input operation with respect to an operation instruction and comprises: an operating unit that is divided into a plurality of subregions and that has at least one input region formed from some or all of the subregions; a region display pattern table 333 that, for each game difficulty level, stores a region display pattern that assigns a specific input region to each of the subregions; an input region forming unit 325 that reads out the region display pattern that accords with the game difficulty level from the storing unit and forms the input region in the operating unit based on the region display pattern that was read out; and a determining unit 324 that determines the operation result based on the operation instruction given to the player and the input region wherein the player's input operation is accepted.

12 Claims, 29 Drawing Sheets

U.S. PATENT DOCUMENTS

| | | | |
|---|---|---|---|
| 6,410,835 B2 * | 6/2002 | Suzuki et al. | 84/464 R |
| 6,632,138 B1 | 10/2003 | Serizawa et al. | |
| 7,090,577 B2 | 8/2006 | Serizawa et al. | |
| 7,367,887 B2 * | 5/2008 | Watabe et al. | 463/36 |
| 7,862,415 B1 * | 1/2011 | Ghaly | 463/9 |
| 2004/0235593 A1 * | 11/2004 | DuFlon et al. | 473/570 |
| 2005/0187023 A1 | 8/2005 | Miyamoto et al. | |
| 2005/0215323 A1 | 9/2005 | Miyamoto et al. | |
| 2006/0052163 A1 * | 3/2006 | Aida | 463/31 |
| 2006/0073863 A1 | 4/2006 | Hagiwara | |

FOREIGN PATENT DOCUMENTS

| | | |
|---|---|---|
| JP | 2005-143714 A | 6/2005 |
| JP | 2005-230460 A | 9/2005 |
| JP | 2006-130303 A | 5/2006 |
| TW | 394702 | 6/2000 |
| TW | 412430 | 11/2000 |
| TW | 487592 | 5/2002 |

OTHER PUBLICATIONS

Taiwanese Office Action of corresponding Taiwanese Application No. 096135160, dated Sep. 7, 2010.

European Search Report of the corresponding European Application No. 07807320.2, dated Dec. 12, 2011.

First Office Action of the corresponding Chinese Patent Application No. 200780042089.6, dated Oct. 10, 2011.

* cited by examiner

| PLAYER ID | PLAYER NAME | AUTHENTICATION INFORMATION | CARD ID | GAME RESULT |
|---|---|---|---|---|
| P0001 | Taro YAMADA | yamada | C0001 | (80) |
| P0002 | Jiro SUZUKI | suzuki | C0002 | (20) |
| | | jiro | C0020 | (90) |
| ⋮ | ⋮ | ⋮ | ⋮ | ⋮ |

FIG. 5

OPERATION SEQUENCE ID: "0002"  331

| TIME | ○ | △ | □ |
|---|---|---|---|
| t0 | 0 | 1 | 0 |
| t1 | 0 | 1 | 0 |
| t2 | 0 | 1 | 0 |
| t3 | 1 | 0 | 0 |
| t4 | 1 | 0 | 0 |
| t5 | 1 | 0 | 0 |
| t6 | 1 | 0 | 0 |
| t7 | 0 | 1 | 0 |
| t8 | 0 | 1 | 0 |
| t9 | 0 | 1 | 0 |
| t10 | 0 | 1 | 0 |
| t11 | 1 | 0 | 0 |
| t12 | 1 | 0 | 0 |
| t13 | 0 | 1 | 0 |
| t14 | 0 | 1 | 0 |
| t15 | 1 | 0 | 0 |
| t16 | 0 | 0 | 1 |
| t17 | 0 | 0 | 1 |
| t18 | 0 | 0 | 1 |
| t19 | 1 | 0 | 0 |
| t20 | 0 | 0 | 1 |

FIG. 7

| OPERATION SEQUENCE ID | I/O LEVEL | DIFFICULTY LEVEL VALUE | GAME DIFFICULTY LEVEL |
|---|---|---|---|
| 0001 | 1 | 1 | 1 |
| | 2 | 2 | 2 |
| | 3 | 3 | 3 |
| | 4 | 4 | 4 |
| | 5 | 5 | 5 |
| | 6 | 6 | 6 |
| 0002 | 1 | 7 | 7 |
| | 2 | 8 | 8 |
| | 3 | 9 | 9 |
| | 4 | 10 | 10 |
| | 5 | 11 | 11 |
| | 6 | 12 | 12 |
| ⋮ | ⋮ | ⋮ | ⋮ |

FIG. 8

| I/O LEVEL | REGION DISPLAY PATTERN ID | SUBREGION NO. | | | | | | | | |
|---|---|---|---|---|---|---|---|---|---|---|
| | | 1 | 2 | 3 | 4 | 5 | 6 | 7 | 8 | 9 |
| 1 | 1001 | ○ | △ | □ | ○ | △ | □ | ○ | △ | □ |
| | 1002 | □ | ○ | △ | □ | ○ | △ | □ | ○ | △ |
| | 1003 | □ | △ | ○ | □ | △ | ○ | □ | △ | ○ |
| | 1004 | ○ | ○ | ○ | △ | △ | △ | □ | □ | □ |
| | ⋮ | | | | | | | | | |
| 2 | 2001 | ○ | △ | □ | ○ | △ | □ | — | — | — |
| | 2002 | — | — | — | ○ | △ | □ | ○ | △ | □ |
| | 2003 | ○ | ○ | — | △ | △ | — | □ | □ | |
| | 2004 | | △ | △ | — | ○ | ○ | — | □ | □ |
| | ⋮ | | | | | | | | | |
| 3 | 3001 | — | — | — | ○ | △ | □ | — | — | — |
| | 3002 | ○ | △ | □ | — | — | — | — | — | — |
| | 3003 | — | — | — | — | — | — | ○ | △ | □ |
| | 3004 | — | — | — | □ | ○ | △ | — | — | — |
| | ⋮ | | | | | | | | | |
| 4 | 4001 | — | — | □ | ○ | — | — | — | △ | — |
| | 4002 | — | △ | — | ○ | — | — | — | — | □ |
| | 4003 | — | — | △ | — | ○ | — | □ | — | — |
| | 4004 | — | △ | — | — | — | ○ | □ | — | — |
| | ⋮ | | | | | | | | | |
| 5 | 5001 | — | — | — | ○ | △ | □ | × | ◎ | ☆ |
| | 5002 | × | ◎ | ☆ | ○ | △ | □ | — | — | — |
| | 5003 | — | — | — | × | ◎ | ☆ | ○ | △ | □ |
| | 5004 | × | ◎ | ☆ | □ | ○ | △ | — | — | — |
| | ⋮ | | | | | | | | | |
| 6 | 6001 | — | × | △ | □ | — | ☆ | ◎ | ○ | — |
| | 6002 | ◎ | — | □ | ○ | △ | — | ☆ | × | — |
| | 6003 | ◎ | — | ☆ | ○ | × | — | — | △ | □ |
| | 6004 | ☆ | △ | × | □ | ◎ | — | — | ○ | — |
| | ⋮ | | | | | | | | | |

FIG. 9

| DIFFICULTY LEVEL VALUE | GAME RESULT |
|---|---|
| 55 | $0 \leqq X < 10$ |
| 70 | $10 \leqq X < 20$ |
| 85 | $20 \leqq X < 30$ |
| 60 | $30 \leqq X < 40$ |
| 70 | $40 \leqq X < 50$ |
| 90 | $50 \leqq X < 60$ |
| ⋮ | ⋮ |

FIG. 12

| TIME | ○ | △ | □ | CHANGE FLAG |
|---|---|---|---|---|
| t0 | 0 | 1 | 0 | 0 |
| t1 | 0 | 1 | 0 | 0 |
| t2 | 0 | 1 | 0 | 0 |
| t3 | 1 | 0 | 0 | 0 |
| t4 | 1 | 0 | 0 | 0 |
| t5 | 1 | 0 | 0 | 0 |
| t6 | 1 | 0 | 0 | 0 |
| t7 | 0 | 0 | 1 | 0 |
| t8 | 0 | 0 | 1 | 0 |
| t9 | 0 | 0 | 1 | 0 |
| t10 | 0 | 0 | 1 | 1 |
| t11 | 0 | 0 | 1 | 0 |
| t12 | 0 | 0 | 1 | 0 |
| t13 | 1 | 0 | 0 | 0 |
| t14 | 1 | 0 | 0 | 0 |
| t15 | 1 | 0 | 0 | 0 |
| t16 | 0 | 1 | 1 | 0 |
| t17 | 0 | 1 | 1 | 0 |
| t18 | 0 | 1 | 1 | 0 |
| t19 | 1 | 0 | 0 | 0 |
| t20 | 0 | 1 | 1 | 1 |

REGION DISPLAY
PATTERN ID = "2001"

t = t10

REGION DISPLAY
PATTERN ID = "2002"

t = t20

REGION DISPLAY
PATTERN ID = "2003"

| OPERATION SEQUENCE ID | TIME INTERVAL | DIFFICULTY LEVEL VALUE | GAME DIFFICULTY LEVEL |
|---|---|---|---|
| 0001 | 20x$\Delta$t | 1 | 1 |
| | 15x$\Delta$t | 2 | 2 |
| | 10x$\Delta$t | 3 | 3 |
| | 5x$\Delta$t | 4 | 4 |
| | 3x$\Delta$t | 5 | 5 |
| | 1x$\Delta$t | 6 | 6 |
| 0002 | 20x$\Delta$t | 7 | 7 |
| | 15x$\Delta$t | 8 | 8 |
| | 10x$\Delta$t | 9 | 9 |
| | 5x$\Delta$t | 10 | 10 |
| | 3x$\Delta$t | 11 | 11 |
| | 1x$\Delta$t | 12 | 12 |
| ⋮ | ⋮ | ⋮ | ⋮ |

FIG. 17

| TIME | ○ | △ | □ | CHANGE FLAG |
|---|---|---|---|---|
| t0 | 0 | 1 | 0 | 0 |
| t1 | 0 | 1 | 0 | 0 |
| t2 | 0 | 1 | 0 | 0 |
| t3 | 1 | 0 | 0 | 0 |
| t4 | 1 | 0 | 0 | 0 |
| t5 | 1 | 0 | 0 | 1 |
| t6 | 1 | 0 | 0 | 0 |
| t7 | 0 | 0 | 1 | 0 |
| t8 | 0 | 0 | 1 | 0 |
| t9 | 0 | 0 | 1 | 0 |
| t10 | 0 | 0 | 1 | 1 |
| t11 | 0 | 0 | 1 | 0 |
| t12 | 0 | 0 | 1 | 0 |
| t13 | 1 | 0 | 0 | 0 |
| t14 | 1 | 0 | 0 | 0 |
| t15 | 1 | 0 | 0 | 1 |
| t16 | 0 | 1 | 1 | 0 |
| t17 | 0 | 1 | 1 | 0 |
| t18 | 0 | 1 | 1 | 0 |
| t19 | 1 | 0 | 0 | 0 |
| t20 | 0 | 1 | 1 | 1 |

| REGION DISPLAY PATTERN ID | SUBREGION NO. | | | | | | | | |
|---|---|---|---|---|---|---|---|---|---|
| | 1 | 2 | 3 | 4 | 5 | 6 | 7 | 8 | 9 |
| 1101 | ○ | △ | □ | ○ | △ | □ | — | — | — |
| 1102 | — | — | □ | ○ | — | — | — | △ | — |
| 1103 | — | — | — | — | — | — | ○ | △ | □ |
| 1104 | × | ◎ | ☆ | ○ | △ | □ | — | — | — |
| ⋮ | | | | | | | | | |

FIG. 20

| TIME | ← | ↓ | ↑ | → | BEGINNING OF BAR | GAME START |
|---|---|---|---|---|---|---|
| t0 | 0 | 0 | 0 | 0 | 0 | 0 |
| t1 | 0 | 0 | 0 | 1 | 1 | 0 |
| t2 | 0 | 0 | 0 | 1 | 1 | 0 |
| t3 | 1 | 0 | 0 | 1 | 1 | 1 |
| t4 | 1 | 0 | 0 | 0 | 0 | 1 |
| t5 | 1 | 0 | 0 | 1 | 0 | 1 |
| t6 | 1 | 0 | 0 | 1 | 0 | 1 |
| t7 | 0 | 1 | 1 | 1 | 1 | 1 |
| t8 | 0 | 1 | 1 | 0 | 0 | 1 |
| t9 | 0 | 1 | 1 | 0 | 0 | 1 |
| t10 | 0 | 1 | 1 | 0 | 0 | 1 |
| t11 | 1 | 0 | 1 | 1 | 1 | 1 |
| t12 | 1 | 0 | 1 | 0 | 0 | 1 |
| t13 | 1 | 1 | 0 | 0 | 0 | 1 |
| t14 | 1 | 1 | 0 | 0 | 0 | 1 |
| t15 | 1 | 0 | 0 | 0 | 1 | 1 |
| t16 | 0 | 1 | 1 | 1 | 0 | 1 |
| t17 | 0 | 1 | 1 | 0 | 0 | 1 |
| t18 | 0 | 1 | 1 | 0 | 0 | 1 |
| t19 | 1 | 0 | 0 | 1 | 1 | 1 |
| t20 | 0 | 1 | 1 | 0 | 0 | 1 |

FIG. 25

| OPERATION SEQUENCE ID | I/O LEVEL | DIFFICULTY LEVEL VALUE | GAME DIFFICULTY LEVEL |
|---|---|---|---|
| 0001 | BASIC | 1 | 1 |
| 0001 | ADVANCED | 2 | 2 |
| 0001 | EXTREME | 3 | 3 |
| 0002 | BASIC | 4 | 4 |
| 0002 | ADVANCED | 5 | 5 |
| 0002 | EXTREME | 6 | 6 |
| 0003 | BASIC | 7 | 7 |
| 0003 | ADVANCED | 8 | 8 |
| 0003 | EXTREME | 9 | 9 |
| 0004 | BASIC | 10 | 10 |
| 0004 | ADVANCED | 11 | 11 |
| 0004 | EXTREME | 12 | 12 |
| ⋮ | ⋮ | ⋮ | ⋮ |

FIG. 26

| I/O LEVEL | REGION DISPLAY PATTERN ID | SUBREGION | | | | | | | |
|---|---|---|---|---|---|---|---|---|---|
| | | 1 | 2 | 3 | 4 | 5 | 6 | 7 | 8 |
| BASIC | 1001 | ⇐ | ⇑ | ⇒ | ⇐ | ⇒ | ⇐ | ⇓ | ⇒ |
| BASIC | 1002 | ⇑ | ⇑ | ⇑ | ⇐ | ⇒ | ⇓ | ⇓ | ⇓ |
| ADVANCED | 2001 | ⇑ | ⇑ | ⇑ | ⇐ | ⇒ | ⇐ | ⇓ | ⇒ |
| ADVANCED | 2002 | ⇐ | ⇑ | ⇒ | ⇐ | ⇒ | ⇓ | ⇓ | ⇓ |
| EXTREME | 3001 | — | ⇑ | — | ⇐ | ⇒ | — | ⇓ | — |
| EXTREME | 3002 | ⇐ | ⇑ | ⇒ | — | — | — | ⇓ | — |
| EXTREME | 3003 | ⇑ | — | ⇒ | — | — | ⇐ | — | ⇓ |

FIG. 27

REGION DISPLAY
PATTERN ID = "1001"
(a)

REGION DISPLAY
PATTERN ID = "3001"
(e)

REGION DISPLAY
PATTERN ID = "1002"
(b)

REGION DISPLAY
PATTERN ID = "3002"
(f)

REGION DISPLAY
PATTERN ID = "2001"
(c)

REGION DISPLAY
PATTERN ID = "3003"
(g)

REGION DISPLAY
PATTERN ID = "2002"
(d)

(a)

(b)

GAME APPARATUS, GAMING METHOD, AND GAME PROGRAM

TECHNICAL FIELD

The present invention relates to a technique whereby the execution of a game is controlled in accordance with the game's level of difficulty.

BACKGROUND ART

A game's difficulty level is generally controlled by a program. For example, music game apparatuses incorporate programs called operation sequences. Based on the given operation sequence, the music game apparatus issues an instruction, on a monitor, regarding the operation members to be operated and the timing with which this instruction is to be carried out. Furthermore, the game apparatus computes a game result by comparing each instruction timing with the timing with which the selected operation member was actually operated.

Instructions are issued regarding operation members and the instruction timing, for example, as follows. Instruction marks, which correspond to the operation members, are scrolled on a monitor screen toward a timing line, and the instruction mark of a certain operation member is made to coincide with the timing line. The greater the number of changes between operation members and the greater the complexity of the operation timing instructed based on the operation sequence, the higher the game's difficulty level.

In addition, in the case of, for example, a throwing game, the game's difficulty level is generally controlled by using a program to control, for example, a target movement speed, a target size, a target number, and the tolerance of a success determination.

DISCLOSURE OF INVENTION

As discussed above, the operation sequence in a music game defines operation members and an instruction timing. Each such operation sequence is created to suit, for example, the rhythm, tempo, length, and melody of each musical performance. Accordingly, every time a musical performance changes or the number of musical performances increases, the creator is burdened with creating new operation sequences. In addition, in cases where multiple operation sequences are created for each musical performance such that they correspond to a plurality of game difficulty levels, the number of operation sequences needed is even greater. For example, to enable a game to have N game difficulty levels for each of M musical performances, the creator must create, one by one, a total of M×N combinations of operation sequences. This increasingly adds to the burden of the creator. Moreover, the contemporariness of the songs played is part of a music game's attraction, and therefore, players of every skill level persistently demand changes in the selection of compositions available for playing. This demand is one factor that makes eliminating the burden on the creator to create operation sequences very difficult.

In addition, in the case of other games, for example, a throwing game, the creator is burdened with creating game programs wherein, for example, the target movement speed, size, and number differ, and then for each such game program, creating additional game programs in accordance with the number of game difficulty levels.

Accordingly, an object of the present invention is to provide a technique that can facilitate the control of game difficulty levels.

To solve the abovementioned problems, a first aspect of the invention provides a game apparatus that determines an operation result based on a player's input operation with respect to an operation instruction and comprises: an operating unit that is divided into a plurality of subregions and that has at least one input region formed from a part of or all of the subregions; a storage that, for each game difficulty level, stores a region display pattern that assigns a specific input region to each of the subregions; an input region forming unit that reads out the region display pattern from the storage that accords with the game difficulty level and forms the input region in the operating unit based on the region display pattern that was read out; and a determining means that determines the operation result based on the operation instruction given to the player and the input region wherein the player's input operation is accepted.

The region display pattern defines, for each game difficulty level, which and how many subregions are assigned to each input region. Thereby, the layout, the sizes, the number, and the like of the input regions in the operating unit are defined. When the player operates an input region in response to an operation instruction, the operation result is determined based on, for example, the relationship between the operated input region and the operation instruction, and the timing with which the input region was operated; thereby, the progress of the game is controlled.

Thus, if the region display pattern—for example, the layout, the sizes, the shape, and the number of input regions—differs in accordance with the game difficulty level, then the difficulty of the input operation of the input regions will also differ. For example, if the area that the player can contact changes as a result of an increase or decrease in the size of the input region, then the ease of the input operation will also change. In addition, the ease with which a target input region can be found changes with the number of available input regions. Furthermore, the difficulty of the input operation can also vary with the layout of each input region, for example, if the layout of the input regions is different from the usual layout.

As described above, the present invention controls the difficulty of the input operation, and in turn the difficulty level of the game, by using a region display pattern that changes in accordance with the game's difficulty level. Accordingly, the game difficulty level can be controlled without changing a program; thereby the time needed to change the program as well as the burden on the program creator can be reduced. In addition, the game difficulty level can be controlled not only by changing the program but also by changing the region display pattern; consequently, the number of variations available for setting the game difficulty level can be increased. In addition, because the layout, sizes, shapes, number, and the like of the input regions, which are directly operated by the player, change, the player can be presented with new attractions that are otherwise unobtainable by changing the program, such as changing the operation difficulty of the operating unit itself.

Furthermore, the game difficulty level may be set either by accepting an input from the player or based on the player's past game results.

A second aspect of the invention provides a game apparatus according to the first aspect, wherein the size of at least one input region varies between region display patterns that correspond to different game difficulty levels.

If the input region is large, then the area that the player can contact is also large, and the input operation is therefore easy. However, if the input region is small, the area that the player can contact is also small, and the input operation is therefore more difficult. Thus, it is possible to control the difficulty of the input operation, and, in turn, the game difficulty level, by varying the sizes of the input regions.

A third aspect of the invention provides a game apparatus according to the first aspect or the second aspect, wherein the number of input regions varies between region display patterns that correspond to different game difficulty levels.

If the number of input regions is small, then the target input region will be able to be easily found; however, if the number of input regions is large, then finding the target input region will become more difficult.

A fourth aspect of the invention provides a game apparatus according to any one aspect of the first through third aspects, wherein the layout of at least one input region varies between region display patterns that correspond to different game difficulty levels.

The layout of the input regions differs from the usual layout, and thereby the operation difficulty of the input operation can also vary as a function of differences in the layout of the input regions. For example, the input regions A, B, C of corresponding operations are usually laid out in an order that corresponds to the positions of operation instructions A, B, C. Here, however, the input regions are laid out in an order that is different from the usual layout order, for example, input regions B, C, A. Because the positions of the operation instructions A, B, C and the layout of the input regions B, C, A do not correspond to one another, it becomes more difficult for the player to operate the input regions, and thereby the game difficulty level can be increased.

A fifth aspect of the invention provides a game apparatus according to any one aspect of the first through fourth aspects, wherein the region display pattern of the storage defines a color, a design, a character, and a symbol, as well as any combination of these, displayed in each input region; and the input region forming unit outputs to the input region the color, the design, the character, and the symbol, as well as any combination of these, defined by the region display pattern.

By outputting, for example, a color to each input region, the player can visually discriminate between the input regions.

A sixth aspect of the invention provides a game apparatus according to any one aspect of the first through fifth aspects, wherein the color, design, character, symbol, and number of combinations thereof of the input region that are displayed by each region display pattern vary in accordance with the game difficulty level.

By varying the number of types of colors and the like that are assigned to each input region, the game difficulty level can be controlled. For example, if the number of types of colors and the like is small, then the input region designated by the operation instruction will be easily found; however, if the number of types of colors and the like is large, then finding the target input region will become more difficult, and therefore the game difficulty level will increase.

A seventh aspect of the invention provides a game apparatus according to any one aspect of the first through sixth aspects, wherein the input region forming unit, reads out from the storage region display patterns according with the game difficulty level one after another, and forms the input region in the operating unit based on the read-out region display patterns at the prescribed time interval.

The layout, sizes, number, and the like of the input regions are changed by virtue of the fact that the region display pattern changes during the game. In addition, attendant with changing the region display pattern, the layout of the colors and the number of types of colors of the input regions output to the operating unit can also be changed. Thus, if the region display pattern changes during a game, the player must continually ascertain the location of each input region, which would increase the difficulty level of the game.

A eighth aspect of the invention provides a game apparatus according to a seventh aspect, wherein the prescribed time interval varies with the game difficulty level.

For example, the higher the game difficulty level, the shorter the time interval between the formation of the input regions based on the new region display pattern; furthermore, the lower the game difficulty level, the longer the time interval between the formation of input regions based on the new region display pattern. Were the time interval to be lengthened as discussed above, the time period during which the size of the input regions does not change would increase. Accordingly, the player would have time to get used to the input operation of the input regions, which would reduce the game difficulty level. Moreover, if the time interval discussed above were shortened, the size of the input regions would continually change. Accordingly, the player would have to deal with input regions that are constantly being re-formed, which would increase the difficulty level of the game.

A ninth aspect of the invention provides a game apparatus according to any one aspect of the first through eighth aspects, wherein the operation instruction is an instruction of the input operation with respect to one of the input regions; and the determining means establishes, based on the region display pattern that was read out, the input region whereat the player's input operation was accepted and determines the operation result based on the input region designated by the operation instruction and the established input region.

Based on the region display pattern, the determining means establishes which input region contains the subregion on which the player performed the input operation. Furthermore, the operation result is determined based on the established input region and the operation instruction. The determination does not merely determine whether the operation was correct or incorrect, but can also determine, for example, the timing with which the operation was performed in response to the operation instruction, the speed of the operation, and the like.

A tenth aspect of the invention provides a game apparatus according to any one aspect of the first through ninth aspects, wherein the operating unit comprises: a displaying means that has a display region wherein one input region or a plurality of input regions can be displayed; and a touch panel that covers the display region of the displaying means.

One input region or a plurality of input regions is displayed in the display region on the displaying means. The touch panel is provided on the displaying means and detects the operation status of each input region.

An eleventh aspect of the invention provides a game apparatus according to any one aspect of the first through ninth aspects, wherein the operating unit is formed from switching units that are adjacently disposed to each other; and each of the switching units forms one of the subregions.

For example, a switching means can be a switch and a button. If some number of adjacent switching means constitutes one group and forms an input region, then that input region is considered to be operated when any of the switching means inside it is operated. A twelfth aspect of the invention provides a gaming method that determines an operation result based on a player's input operation with respect to an operation instruction, comprises: storing a region display pattern for each game difficulty level, a region display pattern assigning a specific input region to each of subregions, an operating unit being divided into a plurality of the subregions and having at least one input region formed from a part of or all of the subregions, reading out the region display pattern and forming the input region in the operating unit based on the read-out region display pattern, the region display pattern according with the game difficulty level and being stored by the step of storing the region display pattern; and determining the operation result based on the operation instruction given to the player and the input region wherein the player's input operation is accepted. The present invention exhibits operational effects like those exhibited in the first aspect of the invention.

A thirteenth aspect of the invention provides a game program, which determines an operation result based on a player's input operation with respect to an operation instruction, that is executed by a computer and that causes the computer to function as: an operating unit that is divided into a plurality of subregions and that has at least one input region formed from some or all of the subregions; a storage that, for each game difficulty level, stores a region display pattern that assigns a specific input region to each of the subregions; an input region forming unit that reads out the region display pattern that accords with the game difficulty level from the storage and forms the input region in the operating unit based on the region display pattern that was read out; and a determining means that determines the operation result based on the operation instruction given to the player and the input region wherein the player's input operation is accepted. The present invention exhibits operational effects like those exhibited in the first aspect of the invention.

The present invention can provide a technique whereby a game's difficulty level can be easily controlled.

BRIEF DESCRIPTION OF DRAWINGS

FIG. 5 is a conceptual explanatory diagram of personal data.

FIG. 7 is one example of operation sequence data that are stored in an operation sequence data table 331.

FIG. 8 is an explanatory diagram that shows one example of a difficulty level value data that is stored in a difficulty level value table 332.

FIG. 9 is an explanatory diagram that shows one example of a region display pattern table.

FIG. 12 is a correspondence table that shows the correspondence between difficulty level values and player past game results.

FIG. 14 is an operation sequence data table wherein a change flag is set.

FIG. 17 is a correspondence table that shows the correspondence between an operation sequence ID, the time interval, the difficulty level value, and the game difficulty level.

FIG. 18 is an operation sequence data table wherein the change flag is set.

FIG. 20 shows a region display pattern table of the operation unit 214 that is stored in a ROM 103.

FIG. 25 is one example of the operation sequence data that are stored in the operation sequence data table 331.

FIG. 26 is an explanatory diagram that shows one example of a difficulty level value data that is stored in the difficulty level value table 332.

FIG. 27 is an explanatory diagram that shows one example of the region display pattern table.

EXPLANATION OF REFERENCE

100 Center server
101 CPU
102 RAM
103 ROM
104 Data storage
200 Game terminal
214 Operation unit

BEST MODE FOR CARRYING OUT THE INVENTION

Figure 1:
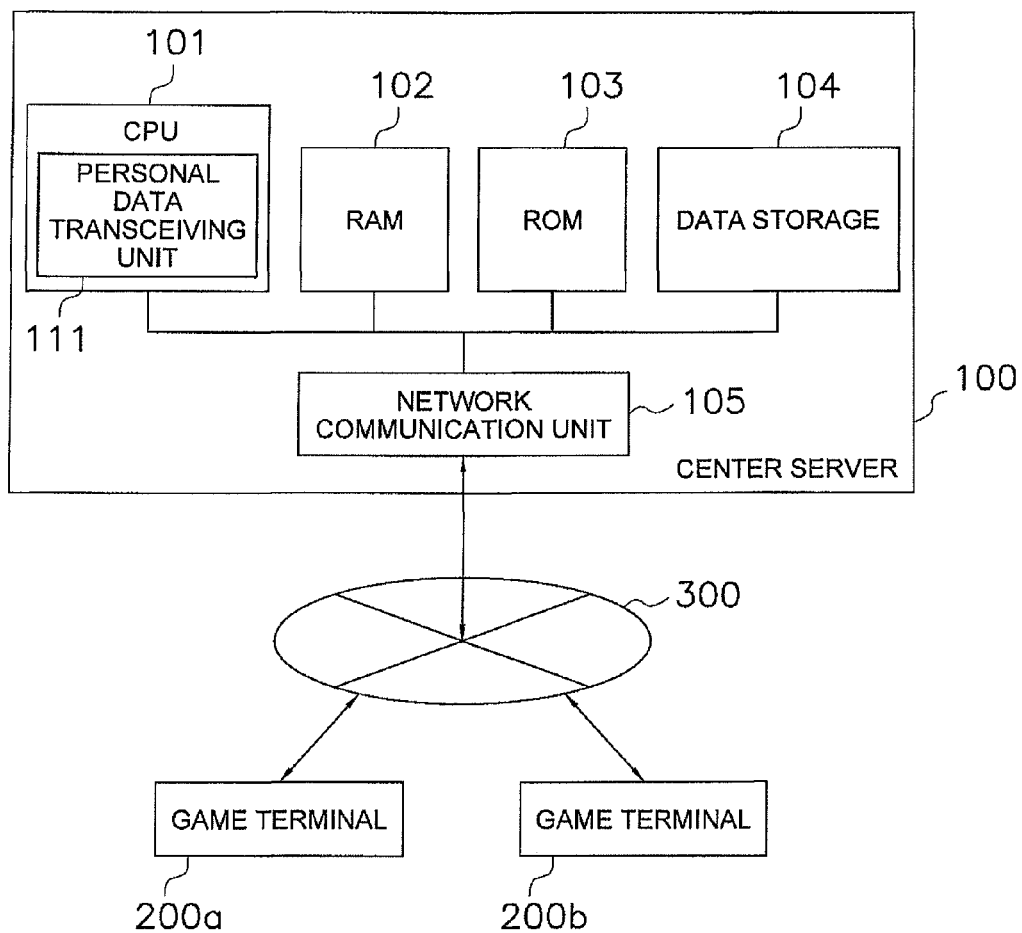
FIG. 1 is an explanatory diagram that shows the entire configuration of a game system according to a first embodiment of the present invention.

First Embodiment (1) Configuration of a Game System According to the Present Embodiment FIG. 1 is an explanatory diagram that shows the entire configuration of the game system according to the first embodiment of the present invention. This game system comprises a center server 100 and a plurality of game terminals 200a, 200b, . . . . The game terminals 200 are connected to the center server 100 via a network 300 such as the Internet.

(1-1) Center Server

The center server 100 receives and stores the personal data of every player from the game terminals 200. In addition, in response to requests from the game terminals 200, the center server 100 transmits personal data to the requesters. The center server 100 comprises the following elements (a)-(e):

(a) CPU 101: implements a plurality of functions, which are discussed later, based on, for example, a control program that is stored in a ROM 103 or a RAM 102.

(b) RAM 102: temporarily stores, for example, the control program and personal data.

(c) ROM 103: stores, for example, the control program.

(d) Data storage 104: accumulates personal data that are transmitted from the game terminals 200 for every player. Personal data contain, for example, authentication information that includes a player ID and a password. The personal data will be discussed later in detail.

(e) Network communication unit 105: sends data to and receives data from the game terminals 200 via the network 300.

(1-2) Game Terminal

Figure 2:
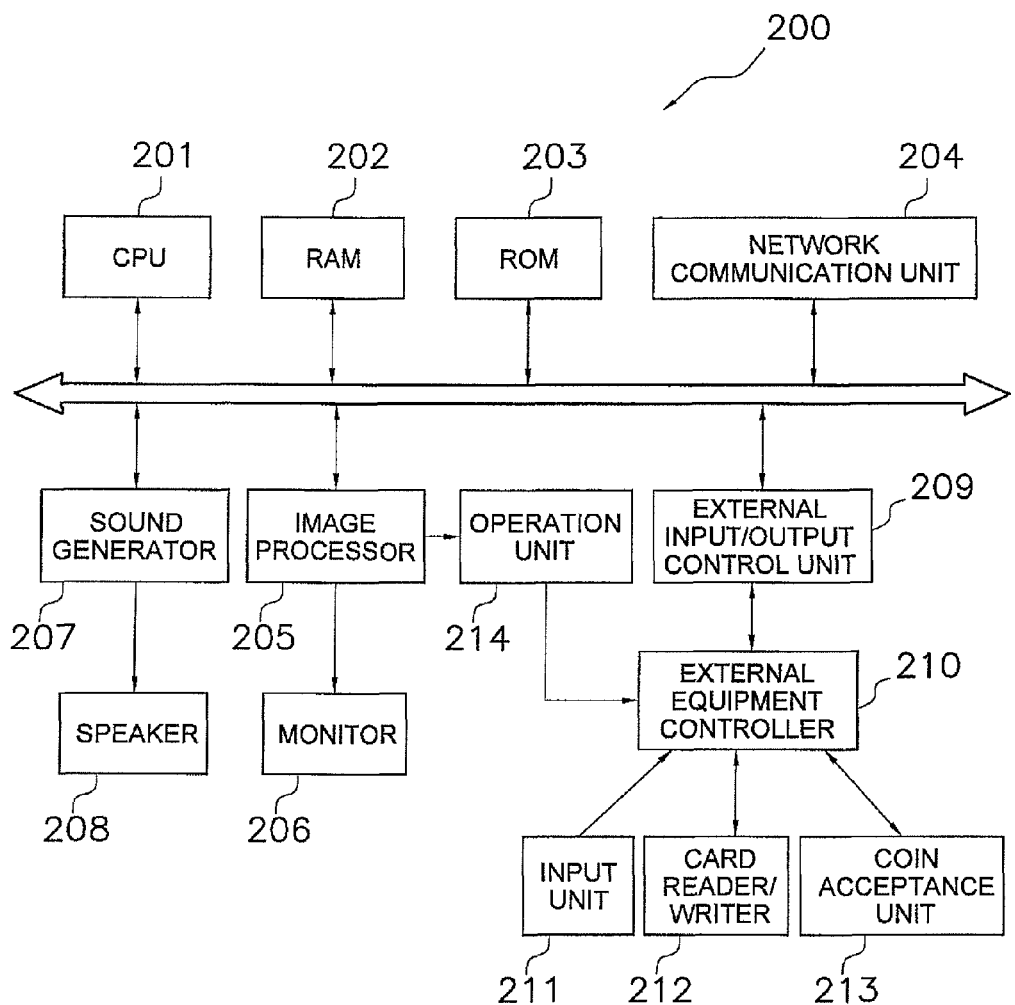
FIG. 2 is one example of the configuration of a game terminal 200.

FIG. 2 shows one example of the configuration of one of the game terminals 200. The game terminal 200 comprises the elements (a)-(n) listed below.

(a) CPU 201: implements a plurality of functions (discussed later) based on, for example, a control program and game data that are stored in a ROM 203 (discussed later).

(b) RAM 202: temporarily stores various game data such as various types of variables and parameters.

(c) ROM 203: stores, for example, the control program and various parameters.

(d) Network communication unit 204: sends data to and receives data from the center server 100 via the network 300.

(e) Monitor 206: displays, for example, operation instructions during a game, game images, results of each game parameter in a game, a character before and after a game, and the like.

(f) Image processor 205: generates image data that are displayed on the monitor 206 and an operation unit 214.

(g) Speaker 208: during game execution, outputs sounds, such as sound effects, when displaying a demo screen, game results, and the like.

(h) Sound generator 207: generates sound data to be output to the speaker 208.

(i) Input units 211: include various buttons, such as a start button and buttons that set the number of players (e.g., one player, two players, etc.).

(j) Operation unit 214: accepts the input operation of a player in response to an operation instruction. In the present embodiment, the operation unit 214 comprises, for example, a display apparatus and a touch panel, which covers the display apparatus. The operation unit 214 is divided into a plurality of subregions; furthermore, input regions, each of which constitutes a unit of input operation, are formed from one or a plurality of these subregions. In accordance with each operation instruction, the player performs an input operation, such as touching an input region.

(k) Card reader/writer 212: reads a card ID from an inserted magnetic card. As needed, a process may be performed that writes, for example, the player ID and the game result to the inserted card.

(l) Coin acceptance units 213: accept credit based on inserted coins.

(m) External equipment controller 210: controls external equipment, such as the input units 211, the card reader/writer 212, the coin acceptance units 213, and the operation unit 214.

(n) External input/output control unit 209: generates control signals for external equipment, such as the input units 211, the card reader/writer 212, the coin acceptance units 213, and the operation unit 214. In addition, it also receives detection signals from the external equipment and transmits such to the CPU 201.

(2) One Example of the Game Terminal (2-1) Configuration of the Game Terminal

Figure 3:
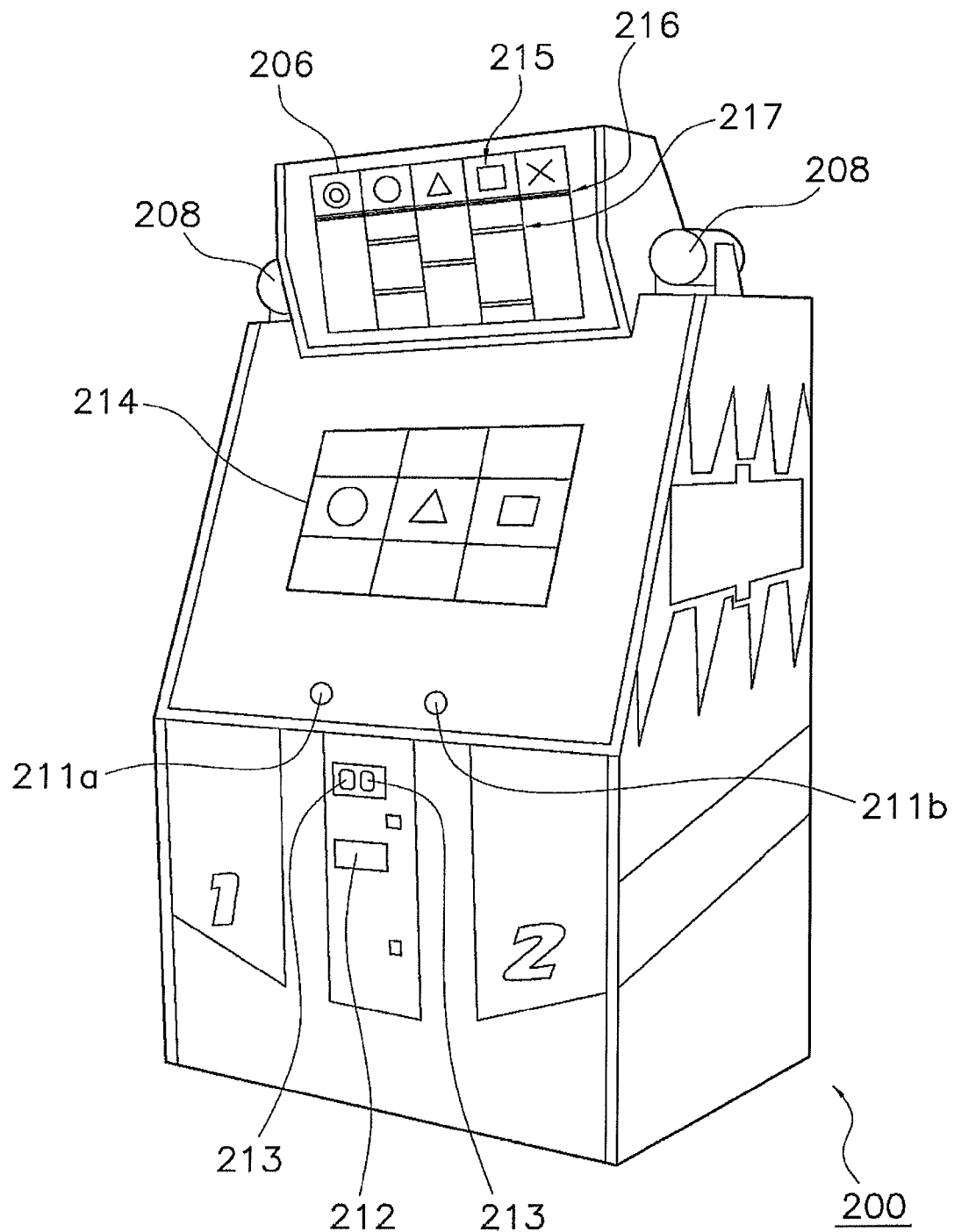
FIG. 3 is an external oblique view of one embodiment of the game terminal 200.

FIG. 3 is an external oblique view of one embodiment of the game terminal 200. The cabinet front surface of this game terminal 200 is provided with the operation unit 214, which comprises, for example, a touch panel. In addition, input units 211a, 211b, such as start buttons, are laterally provided below the operation unit 214, and two coin acceptance units 213 are laterally provided below the input units 211a, 211b. Furthermore, the card reader/writer 212 is provided below the coin acceptance units 213. In addition, the monitor 206 is provided above the operation unit 214, and the speakers 208, which are for outputting performance effects for musical performances, are disposed on both the left and right sides of the monitor 206.

Operation instructions, which include operation targets 215 and operation timings of the operation targets 215, are displayed on the monitor 206. The operation targets 215 each indicate an input region of the plurality of input regions of the operation unit 214 that the player must operate; as shown in FIG. 3, for example, a "circle," a "triangle," and a "square" are displayed. At this time, the operation unit 214 has input regions to which "circle," "triangle," and "square" output patterns are output. Notes 217, which correspond to each of the operation targets 215, move from the lower part to the upper part of the monitor 206 until they reach a reference line 216. The operation timing of each of the operation targets 215 is presented to the player based on when the notes 217 coincide with the reference line 216. For example, the coincidence of the note 217 for the "square" operation target 215 with the reference line 216 instructs the player to operate the input region to which the "square" output pattern is output with a timing that coincides with the note 217 for the "square" operation target 215 reaching the reference line 216.

Figure 4:
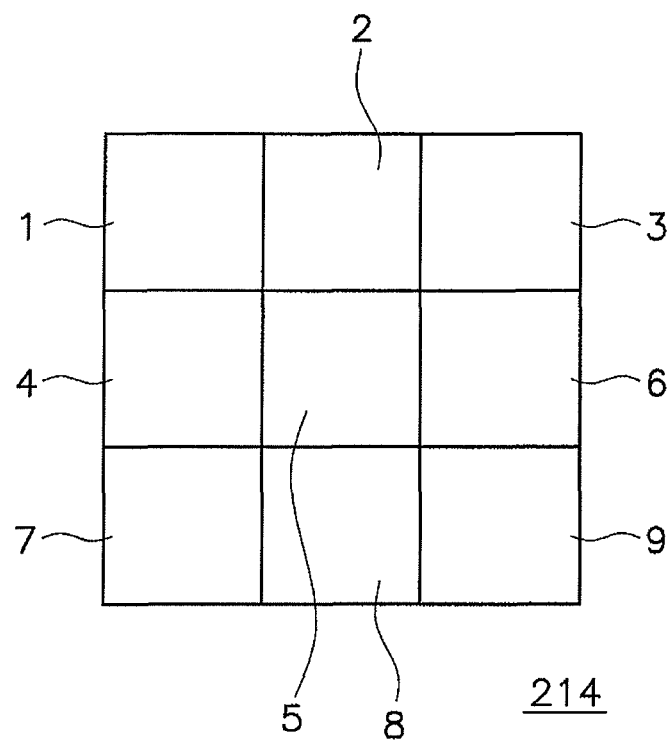
FIG. 4 is an external enlarged view of an operation unit 214.

FIG. 4 is an external enlarged view of the operation unit 214. The operation unit 214 comprises, for example, a display apparatus and a touch panel, which covers the display apparatus, and is divided into a plurality of subregions 1-9, which are arranged three high and three wide. A region display pattern, which assigns an input region specification to each subregion, is output to the display apparatus; furthermore, each input region, which constitutes the unit of input operation, is formed by one or a plurality of subregions. Accordingly, for each input region, the region display pattern defines for each game difficulty level which and how many subregions are assigned. Thereby, the layout, size, number, and the like of the input regions in the operation unit 214 are defined. In addition, the region display pattern defines the output pattern of each input region, such as the color, design, character, symbol, brightness, shade of color, or any combination thereof that is displayed in each input region. Thereby, because the output pattern, such as the color and the design, for each input region is output to the display apparatus, which constitutes the operation unit 214, the player can visually discriminate between the input regions. The player performs the input operations by, for example, touching the input regions in accordance with the operation instructions. The touch panel is provided on the displaying unit and detects whether each of the input regions has been operated.

Examples of display apparatuses include liquid crystal displays, organic electroluminescence displays, and inorganic electroluminescence displays. Furthermore, the number of subregions is not limited to the nine mentioned above.

(2-2) Game Execution

The game terminal 200 configured as described above executes a game as follows in accordance with the control program stored in the ROM 203. A player inserts his or her magnetic card into the card reader/writer 212 of the game terminal 200 and inserts a coin in one of the coin acceptance units 213. The game terminal 200 reads the card ID, which identifies the card, from the magnetic card that was inserted into the card reader/writer 212 and requests the player to input a password. The input password is compared with data in the center server 100 and the individual is thereby authenticated. When the game terminal 200 accepts a game start instruction from an authenticated player, the CPU 201 executes the control program, and thereby the game starts. The game result is calculated based on the execution of the game.

(2-3) Overview of the Game

The following text provides an overview of the game executed by the game terminal 200, once again referencing FIG. 3. First, the game terminal 200 accepts the game difficulty level from the player and sets the game difficulty level accordingly. Alternatively, the game difficulty level may be set in accordance with the player's past game results. The game difficulty level is an index of the difficulty of the game and, for example, as discussed below, is expressed by a difficulty level value between 1 and 99. Next, a set of operation sequence data are selected in accordance with the game difficulty level that was set. The set of operation sequence data constitute a program that defines which operation targets are to be operated and with which operation timing, namely, which input regions are to be operated and when. As shown in FIG. 3, the note 217 for each of the operation targets—such as the "circle," the "triangle," and the "square"—is displayed on the monitor 206 such that it moves from the lower part toward the upper part thereof in accordance with the operation sequence data and reaches the reference line 216. The player operates the input region of the plurality of input regions of the operation unit 214 that is outputting the output pattern that corresponds to the operation target.

The CPU 201 receives a signal from the touch panel and acquires information regarding which input region was operated and when. Furthermore, the CPU 201 determines a game result for the player based on, for example, whether the operation unit 214 was operated in accordance with the operation instruction, the time elapsed between the outputting of the operation instruction and the performance of the operation, and the like.

(3) Functional Configuration of Center Server and Game Terminal (3-1) Functional Configuration of Center Server A personal data transceiving unit 111 in the CPU 101 of the center server 100 shown in FIG. 1 will now be explained.

FIG. 5 is a conceptual explanatory diagram of personal data. The personal data are collected (refer to FIG. 1) by the CPU 101 of the center server 100, which functions as the personal data transceiving unit 111, and are accumulated in the data storage 104.

In the present example, the personal data are structured such that each record contains a "player ID," a "player name," "authentication information," a "card ID," and a "game result." The "player ID" is identification information that identifies the player. The "player name" is the name of the player. The "authentication information" is, for example, a password or a password number that is used to authenticate the player. The "card ID" is identification information that identifies a card owned by the player. Furthermore, a card ID is recorded on each card. The "game result" indicates the cumulative value of the results of games played by the player in the past.

The personal data transceiving unit 111 receives the personal data discussed above from each of the game terminals 200 and updates the data storage 104. For example, if the personal data transceiving unit 111 receives a player ID and a game result from one of the game terminals 200, the cumulative value of the game results corresponding to that player ID is updated.

In addition, in response to a request from one of the game terminals 200, the personal data transceiving unit 111 transmits to the game terminal 200 of the requester the personal data associated with the player ID included in the request.

(3-2) Functional Configuration of the Game Terminal

Figure 6:
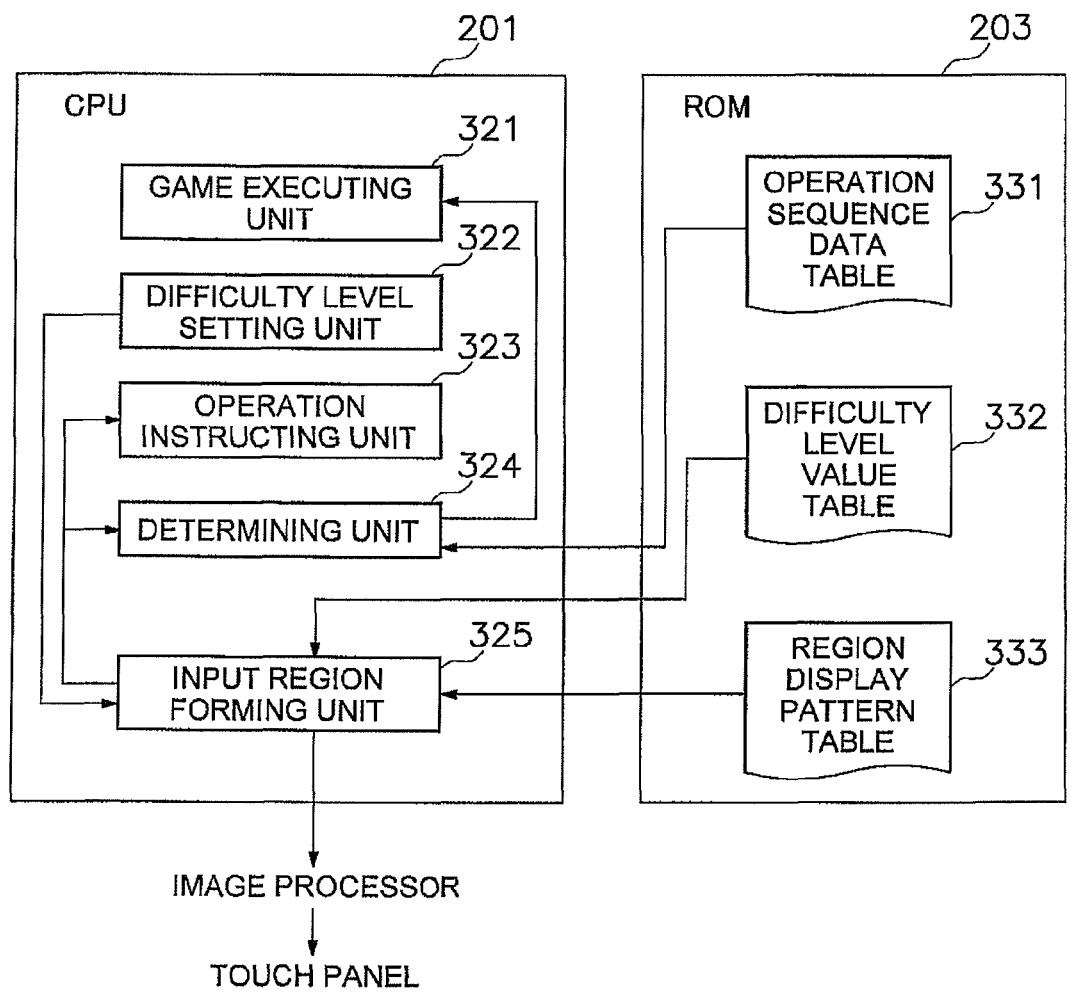
FIG. 6 is an explanatory diagram that shows the functional configuration of the game terminal 200.

FIG. 6 is an explanatory diagram that shows the functional configuration of the game terminal 200. The CPU 201 of the game terminal 200 comprises a game executing unit 321, a difficulty level setting unit 322, an operation instructing unit 323, a determining unit 324, and an input region forming unit 325. The ROM 203 of the game terminal 200 stores an operation sequence data table 331, a difficulty level value table 332, and a region display pattern table 333. Based on these unit and tables, the CPU 201 of the game terminal 200 executes the game and calculates the game result, which it displays on the monitor 206.

(3-2-1) ROM

<Operation Sequence Data Table>

FIG. 7 shows one example of the operation sequence data that are stored in the operation sequence data table 331. The operation sequence data define which operation targets are to be operated and with which operation timing, namely, it defines which input regions are to be operated with which operation timing. Specifically, the operation sequence data associate a "circle" flag, a "triangle" flag, and a "square" flag with a "time" and stores these such that they are associated. For each flag, "1" indicates ON and "0" indicates OFF. For example, at times t0, t1, t2, the "triangle" flag is ON, and therefore the note 217 of the operation target "triangle" is displayed on the monitor 206 such that it moves from the lower part toward the upper part thereof and coincides with the reference line 216 at the times t0, t1, t2.

At this time, the "circle," "triangle," and "square" output patterns are displayed in separate input regions of the operation unit 214. When an instruction to operate the "triangle" input region is output, the player performs an input operation by selecting the "triangle" input region, for example, by touching it. Furthermore, an output pattern other than the operation targets set by the operation sequence data may be displayed in the input regions of the operation unit 214. For example, besides the "circle," "triangle," and "square" output patterns, output patterns such as "double circles," "filled triangles," and "filled circles" may be displayed in the input regions of the operation unit 214. Thereby, the input regions wherein the output pattern that corresponds to the operation instruction is displayed may be intermixed with and buried among numerous other input regions wherein output patterns other than the operation instruction are displayed. Accordingly, it becomes difficult to find the input region that corresponds to the operation instruction, which increases the difficulty level of the game.

<Difficulty Level Value Table>

FIG. 8 is an explanatory diagram that shows one example of the difficulty level value data that is stored in the difficulty level value table 332. The difficulty level value table 332 associatively stores an operation sequence ID, an I/O level, the difficulty level value, and the game difficulty level. The operation sequence ID is an identifier that identifies the operation sequence data. The I/O (input/output) level is an index of the difficulty of the operation for the operation unit 214, whose input regions are formed based on the region display pattern. For example, the operation difficulty is set in steps in ascending order in I/O levels 1-6. Furthermore, the region display pattern defines which subregions are used to form the input regions and which output pattern is displayed in each input region. Here, I/O levels of different difficulty level values are set in the operation sequence data record. In addition, each difficulty level value is indicated by a value between 1 and 99, and the game difficulty level is set corresponding to the magnitude of the difficulty level value. Thus, in the present invention, a plurality of game difficulty levels can be set for one set of operation sequence data.

<Region Display Pattern Table>

FIG. 9 is an explanatory diagram that shows one example of the region display pattern table, and FIGS. 10(a)-(x) are schematic diagrams of the operation unit 214 that are formed based on the region display pattern table. In FIG. 9, the I/O level, a region display pattern ID, and the output pattern of each subregion No. are associated with one another. Multiple region display patterns are systematically categorized into I/O levels based on operation difficulty. Accordingly, as shown in FIG. 9, region display pattern IDs that each correspond to one of the I/O levels are provided. Here, each of the region display pattern IDs identifies a region display pattern. In addition, the subregion Nos. are the numbers 1-9 that are assigned in that order to the subregions 1-9 shown in FIG. 4. The output patterns of the subregion Nos. indicate which output pattern is output to the corresponding subregion of the subregions 1-9. For example, in the case of the region display pattern ID "1001," as shown in FIG. 9, the subregions 1, 4, 7 are set to the "circle" output pattern, the subregions 2, 5, 8 are set to the "triangle" output pattern, and the subregions 3, 6, 9 are set to the "square" output pattern. Thereby, the operation unit 214 shown in FIG. 10(a) is formed.

The I/O levels in the present embodiment will now be explained in further detail. FIGS. 10(a)-(d), FIGS. 10(e)-(h), FIGS. 10(i)-(l), FIGS. 10(m)-(p), FIGS. 10(q)-(t), and FIGS. 10(u)-(x) each show the operation unit 214 for the cases where the I/O level is set to 1, 2, 3, 4, 5, and 6, respectively. In the I/O level 1, one input region is formed from the set of three adjacent subregions. In the I/O level 2, one input region is formed from the set of two adjacent subregions. In the I/O level 3, one input region is formed from one subregion. Accordingly, the size of each input region in the I/O levels 1-3 decreases as the I/O level increases from 1 to 2 to 3. Accordingly, when the input region is large, the area that the player can contact is large, and therefore the input operation is easy. However, when the input region is small, the area that the player can contact is small, and therefore the input operation is more difficult. Accordingly, as the I/O levels increase from 1 to 2 to 3, the difficulty of the operation of inputting to the operation unit 214 increases, and the difficulty level also increases.

In addition, in the I/O level 4, one input region is formed from one subregion and each of the input regions is disposed in a different row on the operation unit 214. Accordingly, compared with the I/O level 3 wherein the input regions are disposed in the same row, there is a greater need in the I/O level 4 to visually scan the entire operation unit 214. Consequently, compared with the I/O level 3, the difficulty of the input operation in the I/O level 4 is greater and the difficulty level is higher.

In the I/O level 5, six input regions are formed from six types of output patterns using two of the three rows of subregions of the operation unit 214. Here, the fewer the number of types of output patterns, the easier it becomes to find the input region designated by the operation instruction; conversely, the greater the number of types of output patterns, the more difficult it becomes to find the target input region, and the higher the difficulty level becomes. Accordingly, compared with the I/O levels 1-4, which each have just three types of output patterns—namely "circle," "triangle," and "square"— the I/O level 5, which has six types of output patterns— namely "circle," "triangle," "square," "X," "double circle," and "star"—has a higher difficulty level. In addition, when viewed from another angle, whereas the target input region can be found easily when the number of input regions is small, when the number of input regions is large, finding the target input region becomes more difficult. Thus, compared with the I/O levels 1-4, which have just three input regions, the I/O level 5, which has six input regions, has a higher difficulty level.

In the I/O level 6, six types of output patterns are disposed such that they are dispersed over the entire operation unit 214. Accordingly, compared with the I/O level 5 wherein each input region is formed using only two of the three rows of subregions, there is a greater need in the I/O level 6 to visually scan the entire operation unit 214. Consequently, compared with the I/O level 5, the difficulty of the input operation in the I/O level 6 is greater, and the difficulty level is higher.

Figure 10:
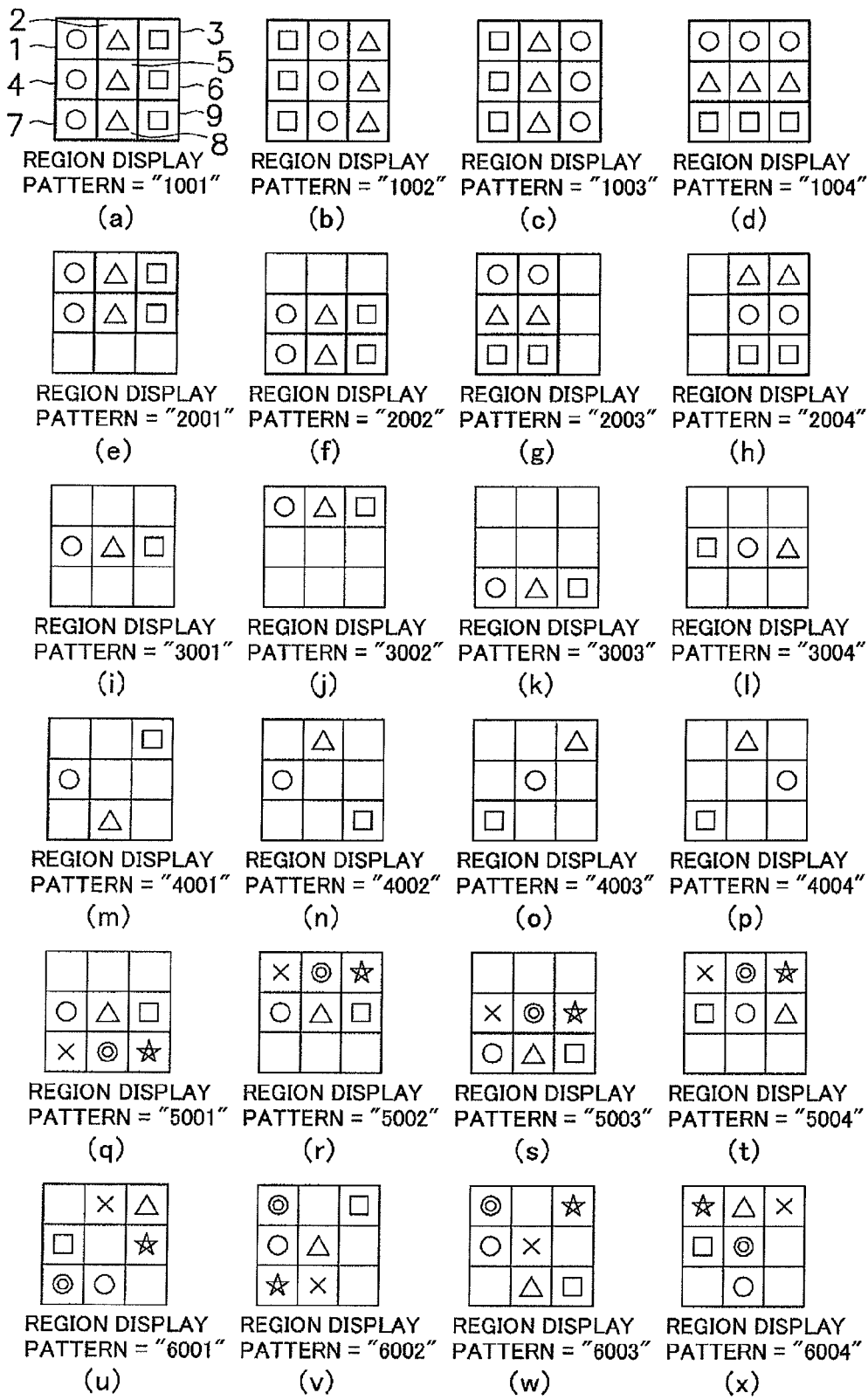
FIGS. 10(a)-(x) each show a schematic diagram of the operation unit 214 that is formed based on the region display pattern table.

Based on the criteria discussed above, the region display patterns are categorized into six I/O levels, as shown in FIG. 9 and FIG. 10. Furthermore, the abovementioned criteria are strictly one example, and the I/O levels may be determined based on other criteria.

(3-2-2) Functions of the CPU

<Game Executing Unit>

Prior to the execution of the game, the game executing unit 321 downloads personal data from the center server 100. The downloaded personal data include the player's past game results.

In addition, the game executing unit 321 calculates the player's game results based on the execution of the game. Specifically, it receives a determination result from the determining unit 324 and calculates the game result based on the determination result. Furthermore, if a game is executed over a plurality of stages, then the game executing unit 321 may calculate the cumulative value of the game result values for every stage after the plurality of stages is complete. The game executing unit 321 displays the game result on, for example, the monitor 206.

<Difficulty Level Setting Unit>

The difficulty level setting unit 322 sets the game difficulty level either by accepting the game difficulty level from the player or in accordance with the player's past game results. A method of setting the game difficulty level in each of these cases is explained below.

Figure 11:
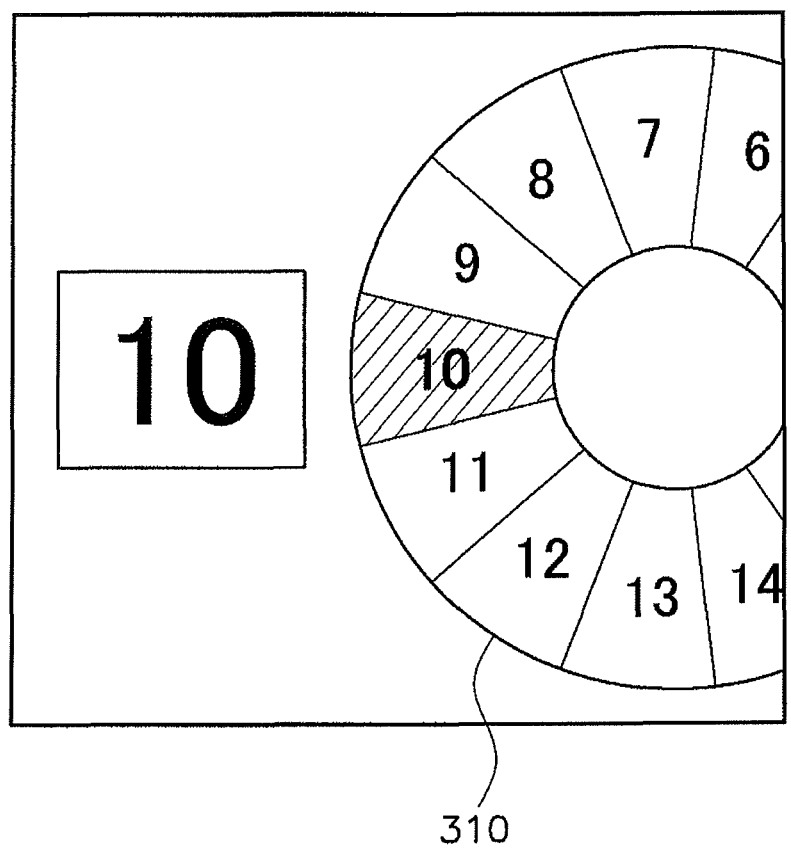
FIG. 11 is one example of a difficulty level selection screen.

FIG. 11 shows one example of a difficulty level selection screen. The difficulty level setting unit 322 displays the difficulty level selection screen shown in FIG. 11 on the monitor 206. The game difficulty levels are displayed in order in a ring shaped table 310. The player scrolls the ring shaped table 310 by operating the input unit 211 and presses the singular set button of the input unit 211 when the desired game difficulty level is reached. As such, the difficulty level setting unit 322 thereby accepts the game difficulty level from the player. In FIG. 11, the game difficulty level "10" is selected and displayed enlarged.

FIG. 12 is a correspondence table that shows the correspondence between the difficulty level value and the player's past game results. First, the difficulty level setting unit 322 reads the past game results of every player from the data storage 104. Furthermore, the difficulty level value corresponding to the past game result is extracted from the correspondence table in FIG. 12. Next, referencing FIG. 8, the game difficulty level is set based on the extracted difficulty level value. The difficulty level setting unit 322 thereby sets the game difficulty level in accordance with the player's past game results.

<Input Region Forming Unit>

Referencing once again FIGS. 8-10, an aspect will now be explained wherein the input region forming unit 325 forms input regions on the operation unit 214.

The input region forming unit 325 sets the operation sequence data and the I/O level based on the game difficulty level that was set. For example, if a game difficulty level of "8" is set, then, based on FIG. 8, the input region forming unit 325 sets the operation sequence ID to "0002" and the I/O level to "2." For example, the operation sequence data shown in FIG. 7 are that for the operation sequence ID "0002."

Next, the input region forming unit 325 randomly extracts a region display pattern ID from the region display pattern IDs that correspond to the set I/O level. In the present embodiment, a plurality of region display pattern IDs is set for each I/O level, and consequently a region display pattern ID is randomly selected from that plurality of region display patterns. Furthermore, because one region display pattern is randomly selected from the plurality of region display patterns set for the same I/O level, the I/O level remains the same regardless of which region display pattern is selected. In addition, the input region forming unit 325 may perform control so that there is no bias in the selection of the region display pattern.

The input region forming unit 325 sets the operation unit 214 based on the region display pattern specified by the randomly selected region display pattern ID. For example, referencing FIG. 9 and as discussed above, the region display pattern ID of, for example, "2002" is set from among the region display pattern IDs that correspond to the I/O level "2." The input region forming unit 325 therefore sets the operation unit 214 as shown in FIG. 10(f) based on the set region display pattern ID "2002."

As another example, if a game difficulty level of "12" were set, then, based on FIG. 8, the input region forming unit 325 would set the operation sequence ID to "0002" and the I/O level to "6." Referencing FIG. 9, the input region forming unit 325 sets the region display pattern ID, which is randomly selected from among the region display pattern IDs that correspond to the I/O level "6," to, for example, "6001." The input region forming unit 325 therefore sets the operation unit 214, as shown in FIG. 10(u), based on the set region display pattern ID "6001."

As discussed above, the operation sequence ID is "0002" both when the game difficulty level is "8" and when the game difficulty level is "12," but the I/O levels are different, namely, one is "2" and the other is "6." Thus, even though the operation sequence data are the same, the game difficulty level can be changed by changing the I/O level.

In addition, the input region forming unit 325 outputs the set operation sequence ID to the operation instructing unit 323 and the determining unit 324.

<Operation Instructing Unit>

The operation instructing unit 323 receives the operation sequence ID, for example, "0002," from the input region forming unit 325. The operation instructing unit 323 outputs—based on the operation sequence data (for the operation sequence ID "0002") shown in FIG. 7 as discussed above—an operation instruction to the player via the monitor 206. For example, the operation instructing unit 323 outputs the operation instruction to the monitor 206 such that the note 217 of the operation target "triangle" moves from the lower part toward the upper part of the monitor 206 and coincides with the reference line 216 at the times t0, t1, t2.

<Determining Unit>

In response to the operation instruction from the operation instructing unit 323, the player performs an input operation with respect to the input region inside the operation unit 214. The determining unit 324 receives the player's input operation and determines the player's operation result.

Here, the determining unit 324 receives the operation sequence ID, for example, "0002," from the input region forming unit 325. The determining unit 324 determines the player's operation result based on: the operation sequence data (for the operation sequence ID "0002") shown in FIG. 7 as discussed above; the output pattern that is output to the input region on the operation unit 214 with which the player has performed an input operation; and the timing with which the input region was operated.

For example, let us assume that the operation unit 214 shown in FIG. 10(a) is used. According to the operation sequence data shown in FIG. 7, the operation instruction is output such that the note 217 of the operation target "triangle" coincides with the reference line 216 at the time t2. Let us assume that the input region (subregions 3, 6, 9) that displays "square" output patterns has been operated with a certain timing with respect to the operation instruction discussed above. In such a case, the input region corresponding to the operation target "triangle" would not operated, and the determining unit 324 would determine that the operation result is "incorrect." Moreover, let us assume that the input region (subregions 2, 5, 8) that displays "triangle" output patterns has been operated with a certain timing with respect to the operation instruction discussed above. In such a case, the input region corresponding to the operation target "triangle" would be operated, and the determining unit 324 would determine that the operation result is "correct." Furthermore, the determining unit 324 makes a determination such that, the smaller the discrepancy between time t2 and the timing with which the input region was operated, the more excellent the determination.

In addition, the determining unit 324 transmits the determination result to the game executing unit 321.

(4) Process Flow

Figure 13:
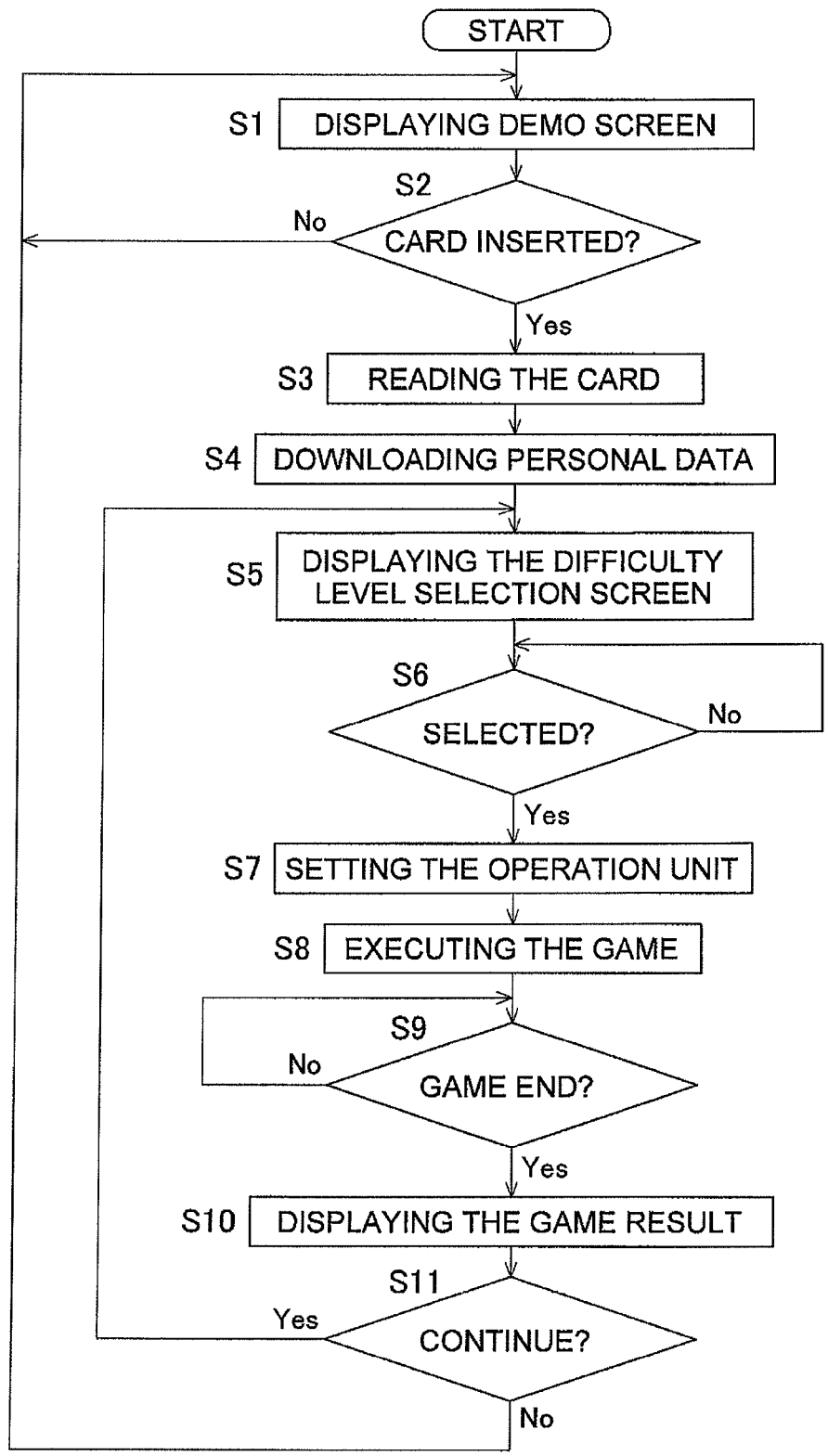
FIG. 13 is a flow chart that shows one example of the flow of the process performed by the game terminal 200.

FIG. 13 is a flow chart that shows one example of the flow of the process performed by the game terminal 200. When the power supply of the game terminal 200 is turned ON, the following process starts.

Steps S1-S2: The CPU 201 stands by, while displaying the demo screen, for the execution of a game (step S1). For example, when a coin is dropped in and the magnetic card is inserted into the card reader/writer 212 (step S2), the method transitions to step S3.

Step S3: The CPU 201 acquires the card ID that was read in by the card reader/writer 212.

Step S4: The CPU 201 transmits the read-in card ID to the center server 100 and downloads the personal data that correspond to the card ID. The downloaded personal data contain authentication information. Subsequently, the CPU 201 requests the player to input authentication information, such as a password. The CPU 201 compares the inputted authentication information with the authentication information that is contained in the personal data and thereby confirms whether the player is actually the player associated with the card ID.

Steps S5-S6: The CPU 201 displays the difficulty level selection screen on the monitor 206 and accepts the selection of one of the difficulty levels.

Step S7: The CPU 201 determines which operation sequence data correspond to the difficulty level and sets the operation unit 214 to that region display pattern.

Steps S8-S9: The CPU 201 outputs, based on the operation sequence data that correspond to the game difficulty level, an operation instruction on the monitor 206. In addition, the CPU 201 accepts the input operation of the player and determines the operation result. The CPU 201 calculates a game result in accordance with the determination result. The CPU 201 executes the game until the game ends.

Step S10: When the game ends, the CPU 201 displays the game result on the monitor 206.

Step S11: The CPU 201 asks the player whether he or she wishes to continue the game; if the game is continued, then the method returns to step S5 and once again accepts the selection of a difficulty level. If the game is not continued, then the method returns to step S1 and displays the demo screen.

In the abovementioned process, a game difficulty level is accepted for each game, and the region display pattern of the operation unit 214 is changed every game; consequently, the player can respond to the operation instruction while noting the change in the region display pattern.

Thus, the difficulty of the input operation, and in turn the difficulty level of the game, is controlled by changing the region display pattern of the operation unit 214. According to the present invention, the game difficulty level can be controlled without changing the operation sequence data, which constitute a program; thereby the time needed to change the program as well as the burden on the program creator to do so can be reduced. In other words, in the present embodiment, as shown in FIG. 8, multiple I/O levels, each having a different difficulty level, are set for each set of operation sequence data. Accordingly, the game difficulty level can be changed by changing the I/O level without changing the operation sequence data. In addition, the game difficulty level can be controlled not only by the program but also by changing the region display pattern of the operation unit 214; consequently, the number of variations available for setting the game difficulty level can be increased. In addition, because the region display pattern of the operation unit 214 directly operated by the player can be changed, the player can be presented with new attractions that are otherwise unobtainable by changing the program. For example, if the region display pattern of the operation unit 214 were to be changed, then it would be pointless to memorize the relationship between the output pattern at each input region in the operation unit 214 and the layout position thereof. Consequently, it is possible to introduce new interest to the game, such as testing the player's reflexes rather than the player's memory.

(5) Modified Examples

The following text explains various modified examples of the above-mentioned embodiment.

(5-1) Modified Example 1

In the abovementioned embodiment, the region display pattern of the operation unit 214 is changed every game in accordance with the game difficulty level. The following modified example 1 explains a case wherein the region display pattern of the operation unit 214 is changed during a game. In modified example 1(a), the region display pattern of the operation unit 214 alone is set in accordance with the game difficulty level, and a time interval, upon which every time it elapses the region display pattern is changed, is set regardless of the game difficulty level. In addition, in modified example 1(b), both the region display pattern of the operation unit 214 and the time interval are set in accordance with the game difficulty level; furthermore, in modified example 1(c) a prescribed time interval alone is set in accordance with the game difficulty level, and the region display pattern of the operation unit 214 is set regardless of the game difficulty level. The following text explains each of the modified examples 1(a)-(c).

(a)

Figure 15:
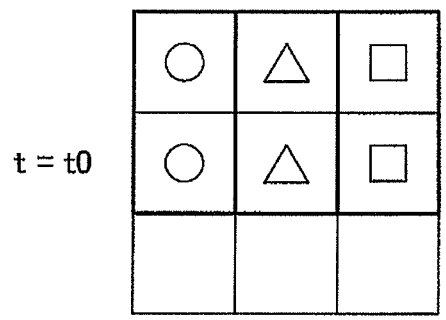
FIG. 15 is an explanatory diagram that shows an aspect wherein the region display pattern of the operation unit 214 changes every time a prescribed time interval elapses.
Figure 15:
Figure 15:
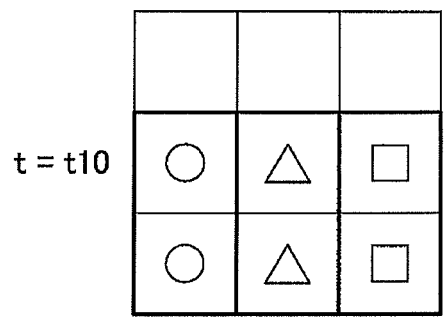
Figure 15:
Figure 15:
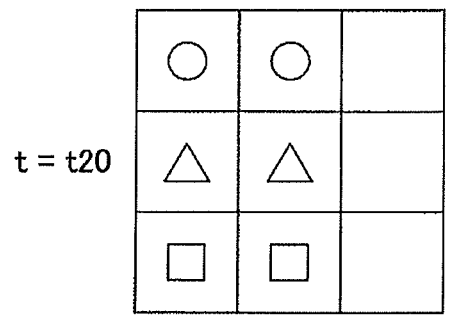
Figure 15:

In modified example 1(a), the region display pattern of the operation unit 214 is set in accordance with the game difficulty level and changed every time a prescribed time interval elapses during each game. FIG. 14 shows the operation sequence data table, wherein a change flag is set, and FIG. 15 is an explanatory diagram that shows an aspect wherein the region display pattern of the operation unit 214 is changed every time the prescribed time interval elapses.

The prescribed time interval is set irrespective of the game difficulty level and is set to, for example, $10 \times \Delta t$. Here, let us assume that $\Delta t$ is the interval between times $t(n-1)$-$tn$ (where n is a natural number greater than or equal to 0) of the operation sequence data (FIG. 14) and is fixed.

Figure 16:
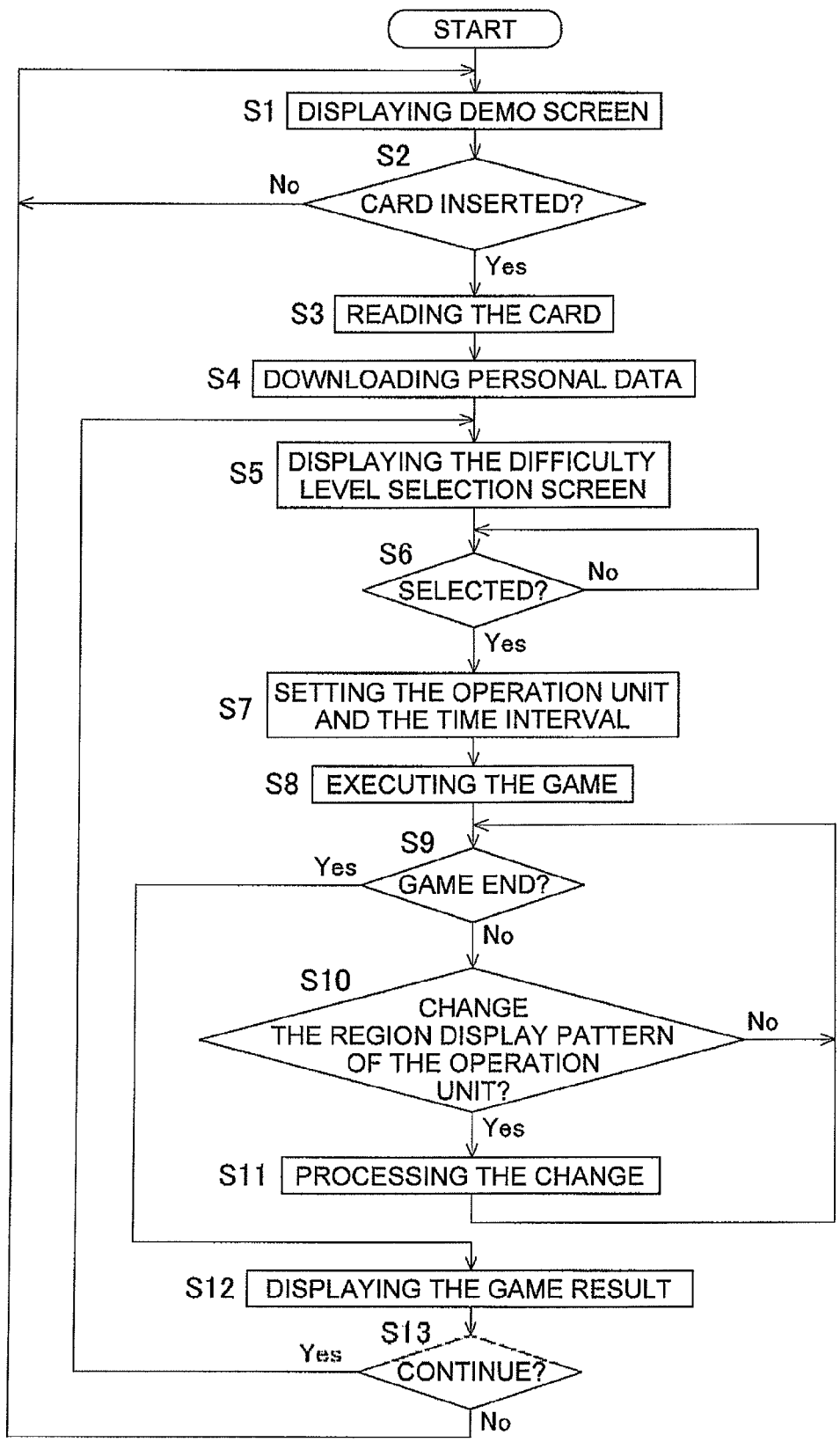
FIG. 16 is a flow chart that shows one example of the flow of the process performed by the game terminal 200.

For example, let us assume that the difficulty level setting unit 322 sets the game difficulty level to "8." Referencing FIG. 8, the input region forming unit 325 would set the I/O level to "2" based on the game difficulty level of "8." Here, the input region forming unit 325 would set the change flag to "1" every time the prescribed time interval $10 \times \Delta t$ elapses, as shown in FIG. 14. A change flag of "1" indicates ON, and "0" indicates OFF. If the change flag transitions to "1," then the input region forming unit 325 would select the region display pattern—of the region display patterns for which the I/O level is "2"—to be set in the operation unit 214. Furthermore, the input region forming unit 325 would change the region display pattern of the operation unit 214 to the selected region display pattern. Thereby, as shown in FIG. 15, the region display pattern of the operation unit 214 can be set to the region display pattern of the region display pattern ID "2001" at, for example, times $t=t0-t10$ and changes at times $t=t10$, $t20 \ldots$ FIG. 16 is a flow chart that shows one example of the flow of the process performed by the game terminal 200. Steps S1-S6 are the same as those in the flow chart in FIG. 13 discussed above, and explanation thereof is therefore omitted.

Step S7: The CPU 201 sets the operation sequence data and the region display pattern of the operation unit 214 in accordance with the difficulty level. The CPU 201 sets the operation sequence data every time the prescribed time interval elapses and sets the operation unit 214 to the selected region display pattern.

Steps S8-S9: The CPU 201 outputs, based on the operation sequence data that correspond to the game difficulty level, the operation instruction to the monitor 206 and accepts the input operation of the player. In addition, the CPU 201 determines the operation result and calculates the game result. The CPU 201 determines the end of the game and executes the game until the game ends.

Steps S10-S11: The CPU 201 determines whether the prescribed time interval has elapsed since the region display pattern of the operation unit 214 was last set. If the prescribed time interval has elapsed, then a new region display pattern will be set and the setting of the operation unit 214 will be changed. The steps that determine whether the prescribed time interval has elapsed and that change the region display pattern are performed repetitively until the game ends.

Step S12: When the game ends, the CPU 201 displays the game result on the monitor 206.

Step S13: The CPU 201 asks the player whether he or she wishes to continue the game; if the game is continued, the method returns to step S5 and once again accepts the selection of the difficulty level. If the game is not continued, then the method returns to step S1 and displays the demo screen.

Thus, as explained in modified example 1(a), the region display pattern of the operation unit 214 is changed in accordance with the game difficulty level every time the prescribed time interval elapses. Thus, by changing the region display pattern during the game, the layout, size, number, and the like of the input regions are changed. In addition, along with the change in the region display pattern, it is also possible to change the layout of the colors and the number of types of colors of the input regions that are output to the operation unit 214. Consequently, the player must operate the operation unit 214 in accordance with region display patterns that are always new. In other words, if the region display pattern of the operation unit 214 is changed every time the prescribed time interval elapses, then it is pointless to memorize the relationship between the operation unit 214 and the region display pattern of that operation unit 214, and therefore the game difficulty level increases. Based on the above, the game difficulty level can also be controlled by changing the region display pattern of the operation unit 214 every time the prescribed time interval elapses.

(b)

Figure 19:
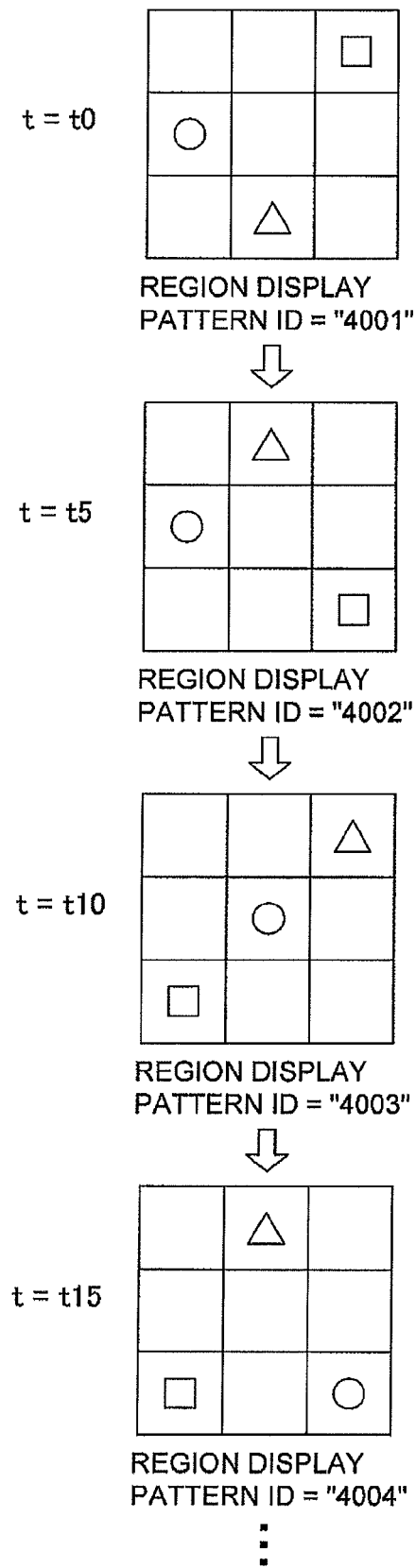
FIG. 19 is an explanatory diagram that shows an aspect wherein the region display pattern of the operation unit 214 changes in accordance with the game difficulty level every time a time interval elapses.

In the abovementioned modified example 1(a), the region display pattern of the operation unit 214 is set in accordance with the game difficulty level and changed every time a prescribed time interval elapses during each game. In the modified example 1(b), however, the prescribed time interval is changed in accordance with the game difficulty level. Accordingly, in the modified example 1(b), the region display pattern of the operation unit 214 and the prescribed time interval are both changed in accordance with the game difficulty level. FIG. 17 is a correspondence table that indicates the correspondence between the operation sequence ID, the time interval, the difficulty level value, and the game difficulty level; FIG. 18 is an operation sequence data table, wherein the change flag is set; and FIG. 19 is an explanatory diagram that shows an aspect wherein the region display pattern of the operation unit 214 is changed using a time interval that is in accordance with the game difficulty level.

As shown in FIG. 17, in the present invention, a plurality of time intervals is set for one set of operation sequence data. A time interval—namely, one of six types including, for example, $20 \times \Delta t$, $15 \times \Delta t$, $10 \times \Delta t$, $5 \times \Delta t$, $3 \times \Delta t$, and $1 \times \Delta t$—is set for each game difficulty level.

For example, let us assume that the difficulty level setting unit 322 sets the game difficulty level to "10." Referencing FIG. 17, the input region forming unit 325 would set, based on a game difficulty level of "10," the operation sequence ID to "0002," set the time interval to $5 \times \Delta t$, and set the change flag. At this time, as shown in FIG. 18, the change flag of the operation sequence data would be set to "1" every time the prescribed time interval of $5 \times \Delta t$ elapses. In addition, based on FIG. 8 and FIG. 9, the input region forming unit 325 would set the I/O level to "4" and randomly set region display patterns of the region display patterns that correspond to the I/O level "4" every time the time interval of $5 \times \Delta t$ elapses. Thereby, as shown in FIG. 19, the region display pattern of the operation unit 214 would change every time the time interval of $5 \times \Delta t$ elapsed.

Here, if the prescribed time interval were lengthened, then the period during which the region display pattern of the operation unit 214 does not change would also lengthen. Accordingly, the player would get used to the input operation of the operation unit 214 and thereby the game difficulty level would decrease. However, if the prescribed time interval were shortened, the region display pattern of the operation unit 214 would continually change. Accordingly, the player would have to operate the operation unit 214 in accordance with a region display pattern that would be constantly new, and therefore the game difficulty level would increase. Based on the above, the game difficulty level can also be controlled by changing both the region display pattern of the operation unit 214 and the time interval upon which every time it elapses the region display pattern is changed in accordance with the game difficulty level.

(c)

Figure 21:
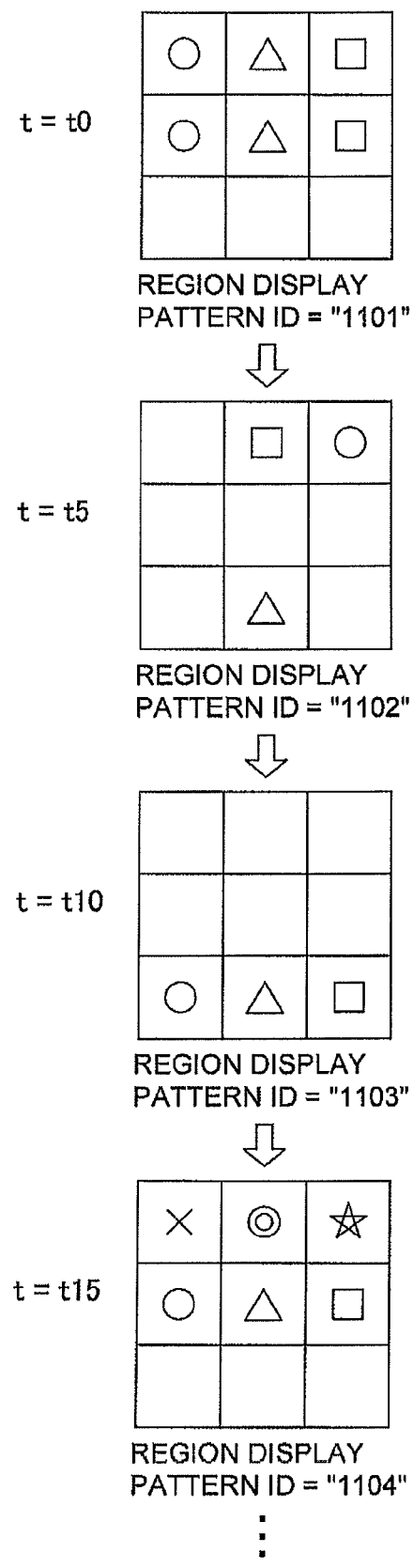
FIG. 21 is an explanatory diagram that shows an aspect wherein the region display pattern of the operation unit 214 changes in accordance with the game difficulty level every time a prescribed time interval elapses.

In the modified example 1(c), the region display pattern of the operation unit 214 is changed in accordance with the game difficulty level every time a prescribed time interval elapses. At this time, the prescribed time interval alone is set in accordance with the game difficulty level and the region display pattern of the operation unit 214 is set irrespective of the game difficulty level. FIG. 20 shows a region display pattern table of the operation unit 214, which is stored in the ROM 103, and FIG. 21 is an explanatory diagram that shows an aspect wherein the region display pattern of the operation unit 214 is changed using a time interval that is in accordance with the game difficulty level.

Similar to FIG. 17, multiple time intervals that accord with the game difficulty level are set for one set of operation sequence data. In addition, as shown in FIG. 20, multiple region display pattern tables of the operation unit 214 are stored, irrespective of the game difficulty level, in the ROM 103. First, the input region forming unit 325 sets the time intervals. Next, the input region forming unit 325 randomly selects region display patterns from FIG. 20 and changes the setting of the region display pattern of the operation unit 214 at the time intervals that were set.

For example, let us assume that the difficulty level setting unit 322 sets the game difficulty level to "10." Referencing FIG. 17, the input region forming unit 325 would set, based on the game difficulty level of "10," the operation sequence ID to "0002" and the time interval to $5 \times \Delta t$. Based on this setting, the input region forming unit 325 would set the change flag at intervals of $5 \times \Delta t$, as shown in FIG. 18. If the change flag transitions to "1," then the input region forming unit 325 would randomly select a region display pattern from the region display pattern table in FIG. 20. Furthermore, the input region forming unit 325 would set the operation unit 214 to the selected region display pattern. For example, as shown in FIG. 21, the region display pattern of the operation unit 214 is set to the region display pattern of the region display pattern ID "1101" at times t=t0–t4, and changes at times t=t5, t10, t15 . . . .

Similar to the abovementioned modified example 1(b), if the prescribed time interval were lengthened, then the game difficulty level would decrease; in addition, if the prescribed time interval were shortened, the game difficulty level would increase. Based on the above, the game difficulty level can also be controlled by changing only the time interval upon which every time it elapses the region display pattern of the operation unit 214 that accords with the game difficulty level is changed.

Furthermore, the time interval upon which every time it elapses the region display pattern is changed during a game does not have to be fixed; for example, the time interval may change during a game such that it is 5×Δt one time and 1×Δt the next.

(5-2) Modified Example 2

Figure 22:
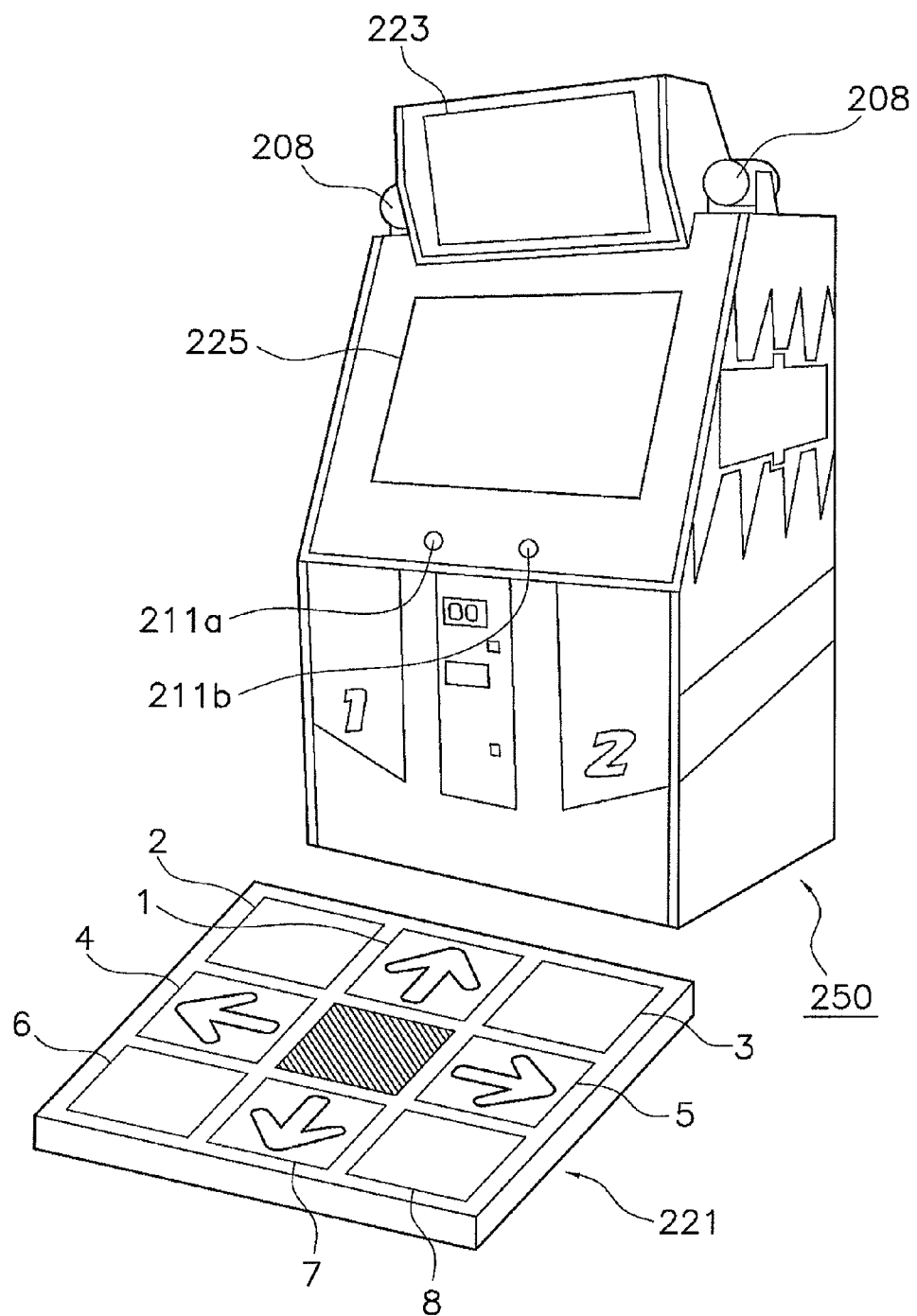
FIG. 22 is an external oblique view of one embodiment of a game terminal 250.
Figure 23:
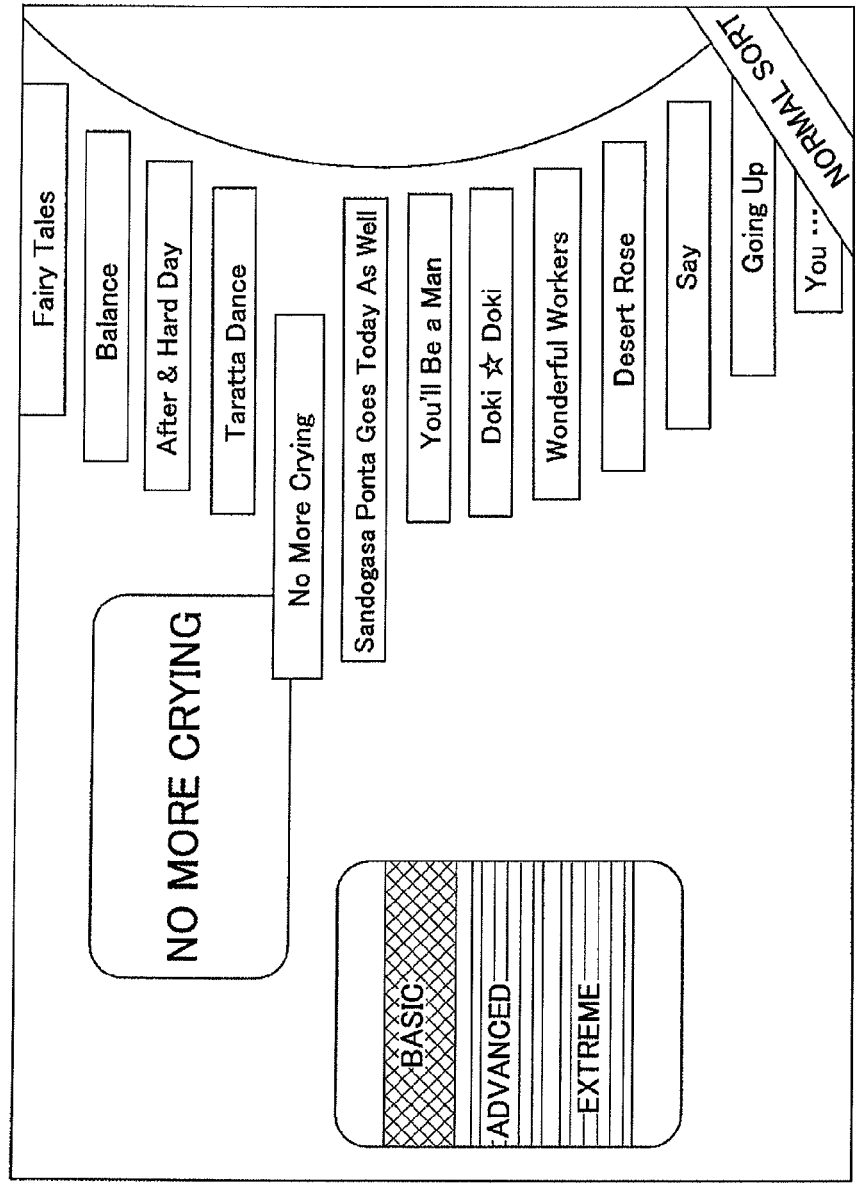
FIG. 23 is one example of the difficulty level selection screen.
Figure 24:
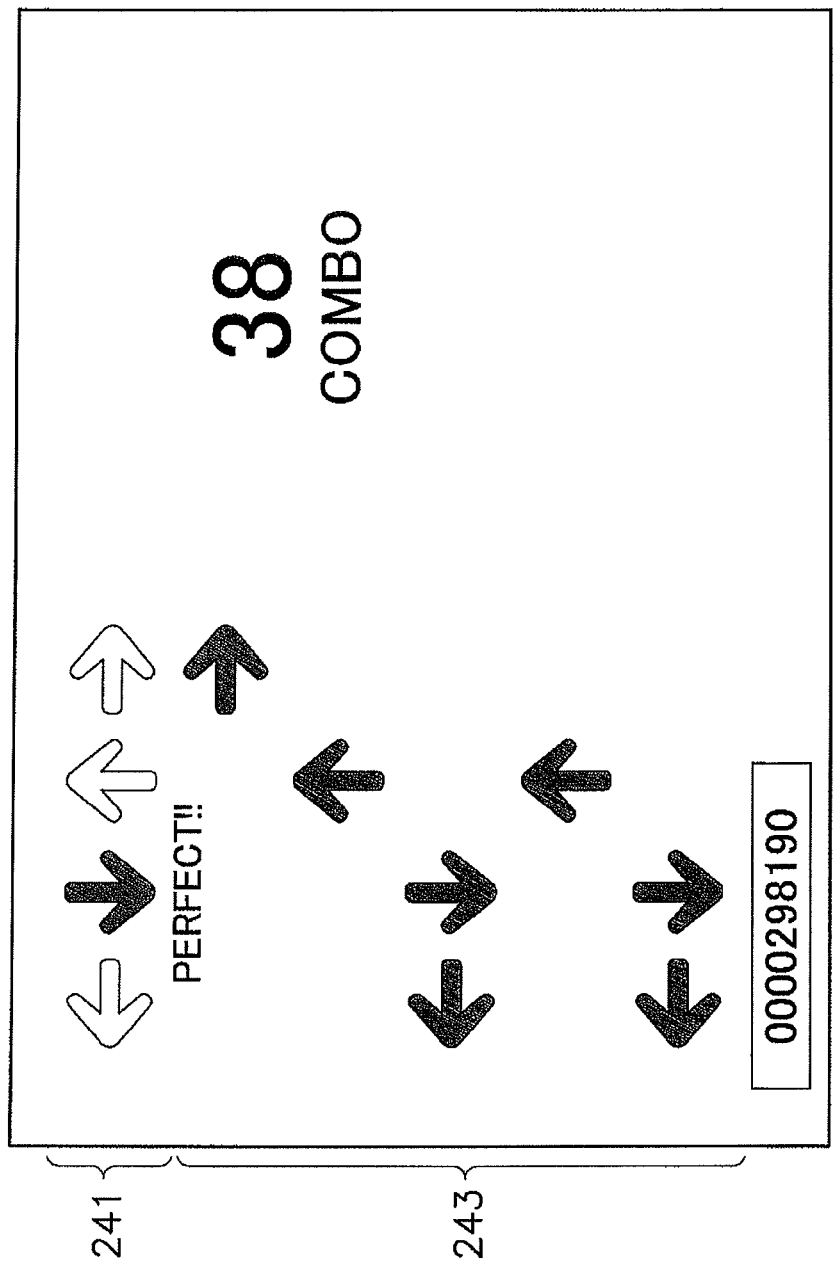
FIG. 24 is one example of an operation instruction screen.

An example of a game terminal to which the present invention can be applied will now be described. FIG. 22 is an external oblique view of one embodiment of a game terminal 250, FIG. 23 is one example of a difficulty level selection screen, and FIG. 24 is one example of an operation instruction screen. Reference symbols and numbers of the game terminal 250 in FIG. 22 that are identical to those in FIG. 3 discussed above represent the same constituent elements, and explanations thereof are therefore omitted.

(a) Configuration of the Game Terminal

In the game terminal 200 in FIG. 3, the player performs the input operation using his or her hands; however, in the game terminal 250 in FIG. 22, the player performs the input operation using his or her feet. Consequently, instead of the operation unit 214, which comprises the display apparatus and the touch panel, that is provided to the game terminal 200 of FIG. 3, an operation unit 221 that comprises a display apparatus and a foot pedal is provided to the game terminal 250.

The operation unit 221 will now be explained in detail. The operation unit 221 is divided into subregions 1-8 that are disposed such that they correspond to three rows and three columns of squares, excluding the center square. Input regions, which comprise one subregion or a plurality of subregions and constitute the unit of input operation, are formed by outputting a region display pattern, which assigns input region specifications to the subregions 1-8, to the display apparatus, which constitutes the operation unit 221. Here, a region display pattern defines, for each game difficulty level, which and how many subregions are assigned to each input region as well as which output pattern is output to which subregion. As shown in FIG. 22, the output patterns are arrows that point in four directions: up, down, left, and right. Based on the above, the layout, sizes, number, and the like of the input regions in the operation unit 221 are defined, and the output patterns, each of which comprises an arrow, are output to the display apparatus for each input region.

In addition, the difficulty level selection screen shown in FIG. 23 is displayed on a first monitor 223. The difficulty level selection screen comprises: a screen for selecting a musical composition; and a screen for setting the I/O level, which indicates the difficulty of operating the operation unit 214. As shown in FIG. 23, a plurality of musical compositions is scrollably displayed on the screen for selecting a musical composition. The player uses the input unit 211 to scroll through the musical compositions and presses a set button, which is one of the input units 211, when the desired musical composition is located. Here, each of the musical compositions has a difficulty level that varies in accordance with the tempo, the number of operations, and the like. Furthermore, three I/O levels—namely, "BASIC," "ADVANCED," and "EXTREME"—are displayed in order of increasing difficulty of operation on the screen for setting the I/O level. The player selects the desired I/O level and then presses the set button. Thereby, the musical composition and the I/O level are set and the game difficulty level is set based on the difficulty level of the musical composition and the difficulty of operating the operation unit 214.

In addition, the operation instruction screen shown in FIG. 24 is displayed on a second monitor 225. In accordance with the operation sequence data of the selected musical composition, arrows 243 (i.e., so-called notes), which point in four directions—namely, up, down, left, and right—move from the lower part toward the upper part of the second monitor 225 and reach a reference arrow 241. The coincidence of each arrow 243 with the reference arrow 241 tells the player when to operate the relevant input region. For example, as shown in FIG. 24, the coincidence of the "down arrow" with the reference arrow 241 instructs the player to operate at the time of that coincidence the input region wherein the "down arrow" is displayed.

(b) Functional Configuration of the Game Terminal

The functional configuration of the game terminal 250 is similar to the functional configuration shown in FIG. 6 discussed above, and therefore the explanation thereof is simplified. FIG. 25 is one example of the operation sequence data that are stored in the operation sequence data table 331. The operation sequence data define which input regions are to be operated and with which operation timings. Specifically, the operation sequence data table 331 associatively stores each flag, which corresponds to one of the arrows in the four directions—namely, up, down, left, and right—and the "time." For each flag, "1" indicates ON, and "0" indicates OFF. For example, at time t3, the "left arrow flag" and the "right arrow flag" are ON, and therefore the "left arrow" and the "right arrow" are displayed on the second monitor 225 such that they move from the lower part toward the upper part of the second monitor 225 and reach the reference arrow 241 at time t3.

FIG. 26 is an explanatory diagram that shows one example of the difficulty level value data that are stored in the difficulty level value table 332. The difficulty level value table 332 associatively stores the operation sequence ID, the I/O level, the difficulty level value, and the game difficulty level. The operation sequence ID is an identifier that identifies the operation sequence data, such as a musical composition.

FIG. 27 is an explanatory diagram that shows one example of the region display pattern table, and FIGS. 28(a)-(g) are schematic diagrams of the operation unit 214 that is formed based on the region display pattern table. In FIG. 27, the I/O level, the region display pattern ID, and the output pattern of each subregion No. are associated with one another. The region display patterns are systematically categorized into I/O levels according to operation difficulty. Furthermore, the region display pattern defines which and how many subregions are used to form the input regions and which output pattern is displayed in each input region. In addition, the subregion Nos. are numbers from 1 to 8 that are assigned, in order, to the subregions 1-8 shown in FIG. 22. Each region display pattern in FIG. 27 is displayed on the operation unit 221, as shown in FIGS. 28(a)-(g).

Here, as shown in FIG. 26, multiple I/O levels of different difficulty level values are provided to each set of operation sequence data. Thereby, in the present invention, even though the operation sequence data remain the same, the game difficulty level can be changed by changing the I/O level.

Figure 28:
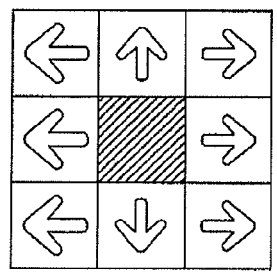
FIGS. 28(a)-(g) each show a schematic diagram of the operation unit 214 that is formed based on the region display pattern table.
Figure 28:
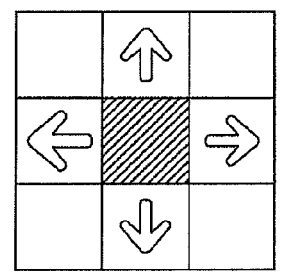
Figure 28:
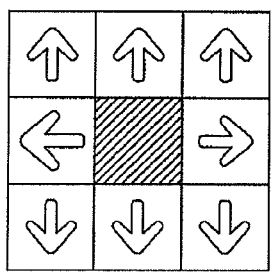
Figure 28:
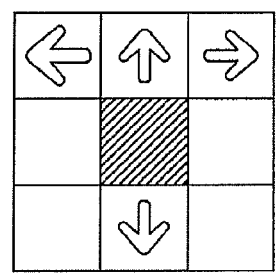
Figure 28:
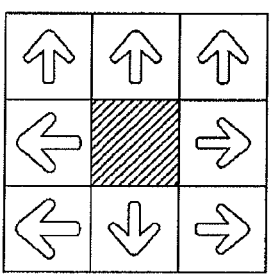
Figure 28:
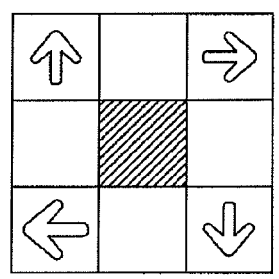
Figure 28:
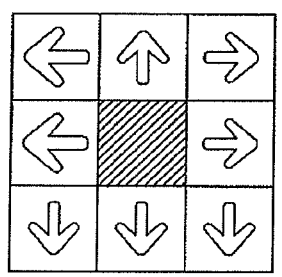

The I/O level of the present embodiment will now be explained in further detail. In the "BASIC" I/O level, two input regions for the "left arrow" and the "right arrow" (refer to FIG. 28(a)) and two input regions for the "up arrow" and the "down arrow" (refer to FIG. 28(b)) are formed by sets of three adjacent subregions. In the "ADVANCED" I/O level, as shown in FIGS. 28(c), (d), one input region is formed by a set of three adjacent subregions and two input regions are formed by sets of two adjacent subregions. In the "EXTREME" I/O level, each input region is formed by one subregion. Here, the greater the number of large input regions, the less difficult the operation becomes, and therefore the lower the I/O level that is set.

(c) Game Overview

The following text provides an overview of a game. First, the difficulty level selection screen shown in FIG. 23 is displayed on the first monitor 223, and the difficulty level setting unit 322 of the game terminal 250 accepts the musical composition and the I/O level from the player. For example, let us assume that the operation sequence ID "0002" and the "EXTREME" I/O level are accepted. Next, the input region forming unit 325 extracts a region display pattern ID, for example "3002" from the region display pattern IDs that correspond to the "EXTREME" I/O level and sets the operation unit 221 accordingly. In addition, based on the operation sequence data that correspond to the operation sequence ID "0002," the operation instructing unit 323 outputs an operation instruction to the player via the first monitor 223. In response to the operation instruction displayed on the first monitor 223, the player operates the corresponding input region of the operation unit 221 with the prescribed timing. The determining unit 324 determines the player's operation result based on: the operation sequence data that correspond to the operation sequence ID "0002"; the output pattern that is output to the input region on which the player performed the input operation; and the timing with which the input region was operated. The game executing unit 321 calculates the game result in accordance with the determination result.

In the abovementioned modified example 2 as well, operational effects like those in the abovementioned embodiment of the present invention can be obtained.

(5-3) Modified Example 3

Figure 29:
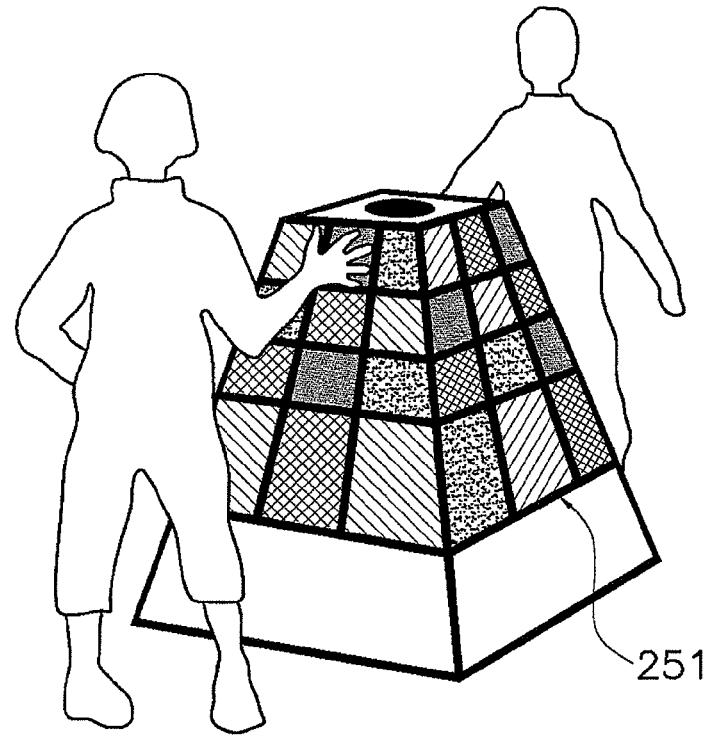
FIGS. 29(a), (b) are each explanatory diagrams that show another example of a game terminal to which the present invention can be adapted.
Figure 29:

FIGS. 29(a), (b) are explanatory diagrams that show other examples of game terminals to which the present invention can be applied. As shown in FIG. 29(a), the present invention is applicable to a game terminal wherein the side surfaces of a cabinet serve as an operation unit 251; in addition, as shown in FIG. 29(b), the present invention is also applicable to a game terminal wherein wall surfaces inside a room serve as an operation unit 253.

(5-4) Modified Example 4

In the abovementioned embodiment, the operation difficulty of the operation unit, and in turn the game difficulty level, varies with the sizes of the input regions, the number of input regions on the operation unit, the number of types of output patterns displayed on the operation unit, and the like. In the modified example 4, the layout of the input regions differs from the usual layout, and thereby the operation difficulty, and in turn the game difficulty level, can also vary as a function of differences in the layout of the input regions. For example, the input regions A, B, C of corresponding operations are usually laid out in an order that corresponds to the positions of operation instructions A, B, C. Here, however, the input regions are laid out in an order that is different from the usual layout order, for example, input regions B, C, A. Because the positions of the operation instructions A, B, C and the layout of the input regions B, C, A do not correspond to one another, it becomes more difficult for the player to operate the input regions, and thereby the game difficulty level can be increased.

An example of a game terminal to which the modified example 4 can be applied is a music game apparatus wherein a controller is used that mimics, for example, a guitar.

Figure 30:
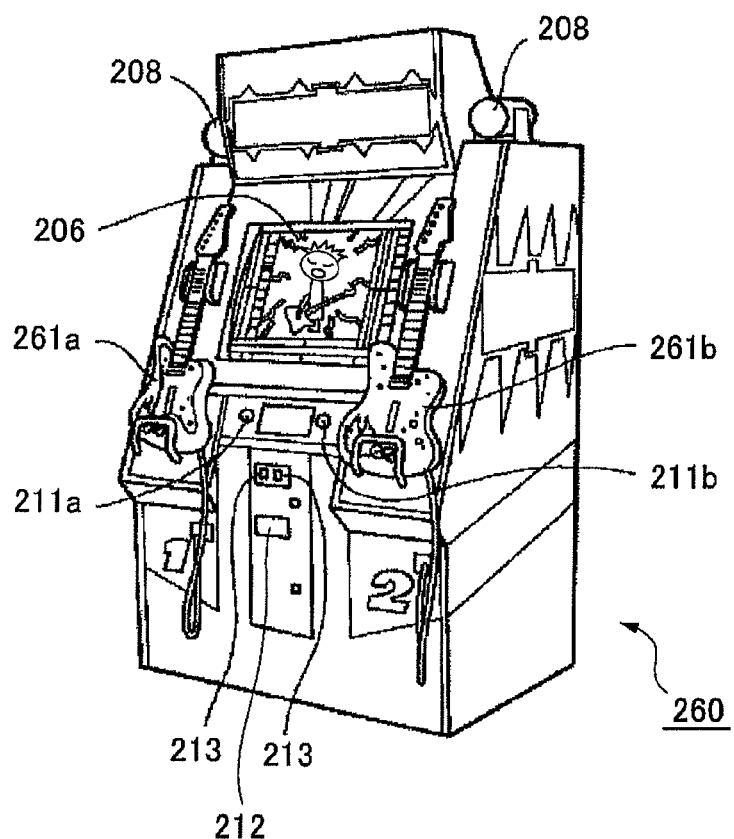
FIG. 30 is an external oblique view of one embodiment of a game terminal 260.
Figure 31:
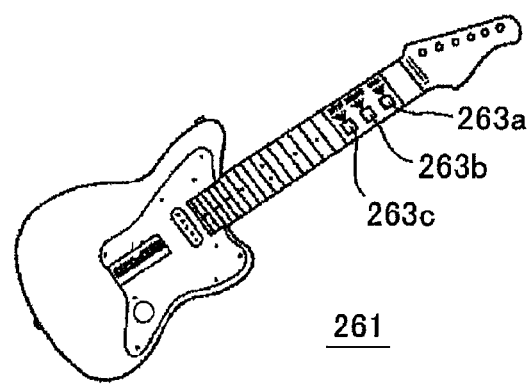
FIG. 31 is an enlarged view of a guitar controller.

FIG. 30 is an external oblique view of one embodiment of a game terminal 260, and FIG. 31 is an enlarged view of a guitar controller. Reference symbols and numbers in the game terminal 260 of FIG. 30 that are identical to those in FIG. 3 discussed above are the same constituent elements, and therefore the explanations thereof are omitted. In addition, the functional configuration of the game terminal 260 is similar to the functional configuration in FIG. 6 discussed above, and therefore the explanation thereof is omitted.

The game terminal 260 in FIG. 30 comprises guitar controllers 261a, 261b. As shown in FIG. 31, a guitar controller 261 comprises three types of neck buttons 263a, 263b, 263c, which accept the operations of the player and serve as an operation unit. The neck buttons in the modified example 4 are equivalent to the input regions in the abovementioned embodiment. Each of the neck buttons 263 (263a, 263b, 263c) is provided with a display. Each display is capable of outputting three output patterns, for example, "R" (red), "G" (green), and "B" (blue); furthermore, each display has four output states, including the three cases wherein any one of the three output patterns is output and the one case wherein all output patterns are OFF. Here, each of the output patterns "R," "Q" and "B" correspond to different rhythmic sounds. Furthermore, by outputting any one of the output patterns "R," "G," or "B" to each of the neck buttons 263a, 263b, 263c, each of the neck buttons 263 becomes a switch that corresponds to a rhythmic sound. For example, if the player performs input operations, such as pressing each of the neck buttons 263a, 263b, 263c, then the rhythmic sounds that correspond to the output patterns of each of those neck buttons 263 are output.

Here, each of the neck buttons 263a, 263b, 263c can output four output states, as discussed above, and therefore a plurality of I/O patterns can be formed by combining the output states of the neck buttons 263a, 263b, 263c. Examples of I/O patterns that are formed include an I/O pattern wherein "R," "G," and "B" are output in order to the neck buttons 263a, 263b, 263c, and an I/O pattern wherein "R," "B," and "G" are output in order to the neck buttons 263a, 263b, 263c. At this time, the operation difficulty of each neck button differs in accordance with the output states of the neck buttons 263a, 263b, 263c. For example, the neck button 263a is usually set to "R," the neck button 263b is usually set to "Q" and the neck button 263c is usually set to "B." However, if the neck button 263a were set to "B," the neck button 263b to "R," and the neck button 263c to "G," then the operation difficulty of the neck buttons 263 would increase because the layout would differ from the usual layout.

In addition, for each musical composition, the game terminal 260 has a set of operation sequence data that define the operation timing for each rhythmic sound, namely, "R," "G," and "B." Specifically, the operation sequence data table associatively stores an "R" flag, a "G" flag, a "B" flag, and a "time." The "R" flag, the "G" flag, and the "B" flag correspond to "R," "G," and "B," respectively, which represent the rhythmic sounds. Here, in the modified example 4, multiple I/O patterns of different operation difficulties are associated with one set of operation sequence data. Thereby, a plurality of game difficulty levels can be set for one set of operation sequence data.

When a game is started, the player selects a musical composition and an I/O pattern, which is set in the neck buttons 263. Here, the game difficulty level is set based on the selected musical composition and I/O pattern. The output state of each of the neck buttons 263a, 263b, 263c is set based on the selected I/O pattern. The CPU 201 of the game terminal 260 outputs, based on the operation sequence data that accord with the selected musical composition, an operation instruction to the monitor 206 that instructs the player to operate the neck buttons 263a, 263b, 263c. The player operates the neck buttons 263a, 263b, 263c in response to the operation instruction. The CPU 201 receives signals from the operated neck buttons 263a, 263b, 263c, detects which neck buttons 263a, 263b, 263c—namely, which input regions—were operated and when, and calculates the player's game result.

Thus, the difficulty of the input operation of each of the neck buttons 263a, 263b, 263c, and in turn the game difficulty level, can be controlled by changing the I/O pattern of the neck buttons 263a, 263b, 263c. Accordingly, in the modified example 4, too, operational effects like those of the abovementioned embodiment can be obtained. Furthermore, examples of displays include liquid crystal displays, organic electroluminescence displays, and inorganic electroluminescence displays.

(5-5) Modified Example 5

The operation unit may also be formed from switching unit that are disposed adjacently. A switching unit includes, for example, a switch and a button, and each switching unit forms a subregion. Here, if some number of adjacent switching unit constitutes one group and forms an input region, then that input region is considered to be operated when any of the switching unit inside it is operated.

(5-6) Modified Example 6

The present invention encompasses both a program for executing the method discussed above on a computer and a computer readable storage medium whereon such a program is recorded. Here, the program may be downloadable. Examples of storage media include a computer readable/ writable flexible disk, a hard disk, semiconductor memory, a CD-ROM, a DVD, and a magneto-optic (MO) disk.

INDUSTRIAL APPLICABILITY

The game apparatus, the gaming method, and the game program according to the present invention are applicable to any game that outputs an operation instruction to a player using operation sequence data.

What is claimed is:

1. A game apparatus determining an operation result based on a player's input operation with respect to an operation instruction, comprising:
   an operating unit defining a plurality of subregions and configured to receive the input operation from the player in one subregion or the plurality of subregions;
   a region display pattern storage unit configured to store a plurality of input/output levels, a plurality of region display pattern IDs, a plurality of region display patterns, the region display pattern storage unit being configured to associate one region display pattern with a corresponding region display pattern ID, the region display pattern storage unit being further configured to associate each input/output level with a plurality of the region display pattern IDs, the region display pattern storage unit being further configured such that each of the region display patterns is to be outputted to corresponding ones of the plurality of subregions;
   an operation sequence data storage unit configured to store operation sequence data, and configured to associate operation timing of the plurality of subregions with the region display patterns to be outputted to or the plurality of subregions;
   a difficulty level storage unit configured to store a plurality of difficulty level values and a plurality of game difficulty levels associated with one another, with a plurality of the input/output levels being associated with a portion of the difficulty level values and a portion of the game difficulty levels, such that each one of the operation sequences is associated to at least two of the plurality of the difficulty level values;
   an input region forming unit configured to search the plurality of the input/output levels of the difficulty level storage unit for a selected one of the game difficulty levels and read-out associated ones of the region display patterns corresponding to the searched game difficulty level and associated with the data in the region display pattern storage unit and output the associated the region display pattern to the plurality of subregions based on the read-out region display pattern;
   an operation instructing unit configured to output operation instruction based on the operation sequence data associated with the game difficulty level in the difficulty level storage unit; and
   a determining unit configured to determine the player's operation result based on a comparison between the operation instruction outputted to the plurality of subregions of the operation unit and thereby provided to the player, the region display patterns displayed on corresponding ones of the plurality of subregions, the player's input operation being accepted and the timing the player's operation being accepted, and the determining unit further determining whether the player's input and operation was correct or incorrect.

2. A game apparatus according to claim 1, further comprising
   an input region is defined by at least one of the plurality of subregions, the size of the input region varies between region display patterns corresponding to different game difficulty levels.

3. A game apparatus according to claim 1, further comprising
   a plurality of input regions is defined by at least one of the plurality of subregions, the number of the input regions varies between respective ones of the region display patterns corresponding to different game difficulty levels.

4. A game apparatus according to claim 1, further comprising
   an input region is defined by at least one of the plurality of subregions, the layout of the input region varies between respective ones of the region display patterns corresponding to different game difficulty levels.

5. A game apparatus according to claim 1, wherein
   the region display pattern of the region display pattern storage unit defines a color, a design, a character, and a symbol, as well as any combination of these, displayed in at least one of the plurality of subregions; and
   the input region forming unit outputs to at least one of the plurality of subregions the color, the design, the character, and the symbol, as well as any combination of these, defined by the region display pattern.

6. A game apparatus according to claim 5, wherein
the color, design, character, symbol, and any number of combinations thereof of the plurality of subregions vary in accordance with the game difficulty level,
the color, design, character, symbol, and number of combinations thereof the plurality of subregions being displayed by each region display pattern.

7. A game apparatus according to claim 1, further comprising
an input region is defined by at least one of the plurality of subregions, the input region forming unit reads out from the storage region display patterns according with the game difficulty level one after another based on a prescribed time interval, and
the input region forming unit forms the input region in the operating unit based on the read-out region display patterns at the prescribed time interval.

8. The game apparatus according to claim 7, wherein
the prescribed time interval varies with the game difficulty level.

9. A game apparatus according to claim 1, further comprising
an input region defined by at least one of the plurality of subregions,
the operation instruction is an instruction of the input operation with respect to the plurality of subregions;
the determining unit establishes the plurality of subregions based on the read-out region display patterns, the read-out region display patterns having accepted the player's input operation, and
the determining unit determines the operation result based on the plurality of subregions designated by the operation instruction and the established one subregion or the plurality of subregions.

10. A game apparatus according to claim 1, further comprising
an input region defined by at least one of the plurality of subregions,
the operating unit has:
    a display unit with a display region, the plurality of subregions can be displayed at the display region; and
    a touch panel covering the display region of the displaying unit.

11. A game apparatus according to claim 1, wherein
the operating unit is formed from switching units,
each of the switching units is adjacently disposed to each other; and
each of the switching units forms one of the subregions.

12. A gaming method determining an operation result based on a player's input operation with respect to an operation instruction, comprising the steps of:
storing a plurality of input/output levels, a plurality of region display pattern IDs and a plurality of region display patterns, such that each one region display pattern is associated with a corresponding region display pattern ID, and each input/output level is associated with a plurality of the region display pattern IDs, each of the region display patterns being associated with an output pattern to be outputted to corresponding ones of the plurality of subregions of the operating unit;
storing operation sequence data such that operation timing of the plurality of the subregions is associated with the region display patterns to be outputted to the plurality of the subregions;
storing a plurality of difficulty level values and a plurality of game difficulty levels associated with one another, with a plurality of the input/output levels being associated with a portion of the difficulty level values and a portion of the game difficulty levels, such that each one of the operation sequences is associated to at least two of the plurality of the difficulty level values;
searching the plurality of the input/output levels for a selected one of the game difficulty levels;
reading out associated ones of the region display patterns corresponding to the selected game difficulty level and outputting the associated region display pattern to the plurality of subregions;
outputting operation instructions based on the operation sequence data associated with the game difficulty level; and
determining the player's operation result based on a comparison between the operation instruction given outputted to the plurality of subregions of the operation unit and thereby providing to the player, the region display patterns displayed on the corresponding ones of the plurality of subregions, the player's input operation being accepted and the timing of the player's operation being accepted, and determining whether the player's input and operation was correct or incorrect.

* * * * *